United States Patent [19]
Fell

[11] Patent Number: 5,735,986
[45] Date of Patent: Apr. 7, 1998

[54] CONTINUOUS PROCESS FOR THE PREPARATION OF HONEYCOMB STRUCTURAL MATERIAL AND APPARATUS SUITABLE FOR USE THEREIN

[76] Inventor: Barry Michael Fell, 7124 Red Top Rd., Hummelstown, Pa. 17036

[21] Appl. No.: 552,376

[22] Filed: Nov. 3, 1995

[51] Int. Cl.⁶ .................................................. B32B 31/00
[52] U.S. Cl. .............................. 156/160; 156/197; 156/210
[58] Field of Search ................................ 156/60, 148, 155, 156/160, 197, 210, 227

[56] References Cited

U.S. PATENT DOCUMENTS

| Re. 26,287 | 10/1967 | Wasilisin et al. | 219/83 |
|---|---|---|---|
| 2,821,616 | 1/1958 | Spott | 219/78 |
| 2,968,712 | 1/1961 | Runkle | 219/82 |
| 3,162,765 | 12/1964 | Rohr | 219/83 |
| 3,283,118 | 11/1966 | Runkle | 219/79 |
| 3,356,555 | 12/1967 | Jackson | 156/205 |
| 4,957,577 | 9/1990 | Heubner | 156/197 |
| 5,131,970 | 7/1992 | Potter et al. | 156/205 |
| 5,139,596 | 8/1992 | Fell | 156/205 |
| 5,277,732 | 1/1994 | Meier | 156/197 |
| 5,296,280 | 3/1994 | Lin et al. | 428/118 |
| 5,354,394 | 10/1994 | Seebo et al. | 156/358 |
| 5,399,221 | 3/1995 | Casella | 156/274.4 |
| 5,421,935 | 6/1995 | Dixon et al. | 156/197 |

FOREIGN PATENT DOCUMENTS 2188166   9/1987   United Kingdom.

*Primary Examiner*—Timothy Speer
*Attorney, Agent, or Firm*—Brooks & Kushman

[57] ABSTRACT

A process for the continuous preparation of non-expanded honeycomb core from non-precorrugated web involves the progressive corrugation and consolidation of web by a corrugating/consolidating unit containing corrugating and consolidating elongate teeth which traverses a bed unit containing sets of former bars, forming a half cell height of honeycomb at each pass. A plurality of node-antinode demes of the topmost half cell layer being formed are consolidated while new corrugations and associated node-antinode demes are being formed. The process allows for more lengthy consolidation time, a smaller temperature differential between consolidating teeth and the node-antinode demes being consolidated, and further allows the corrugating and consolidation temperatures to be substantially independent of each other. The process may be implemented through use of a corrugating/consolidation unit having a travelling belt containing corrugating and/or consolidating teeth which may be individually and selectively heated. The process and apparatus allows production of honeycomb even from thin thermoplastic web materials at high production rates. In a preferred embodiment, the teeth are radiant energy transmissive teeth associated with a source of radiant energy directed through the teeth toward the bottom, node-antinode contacting face.

26 Claims, 15 Drawing Sheets

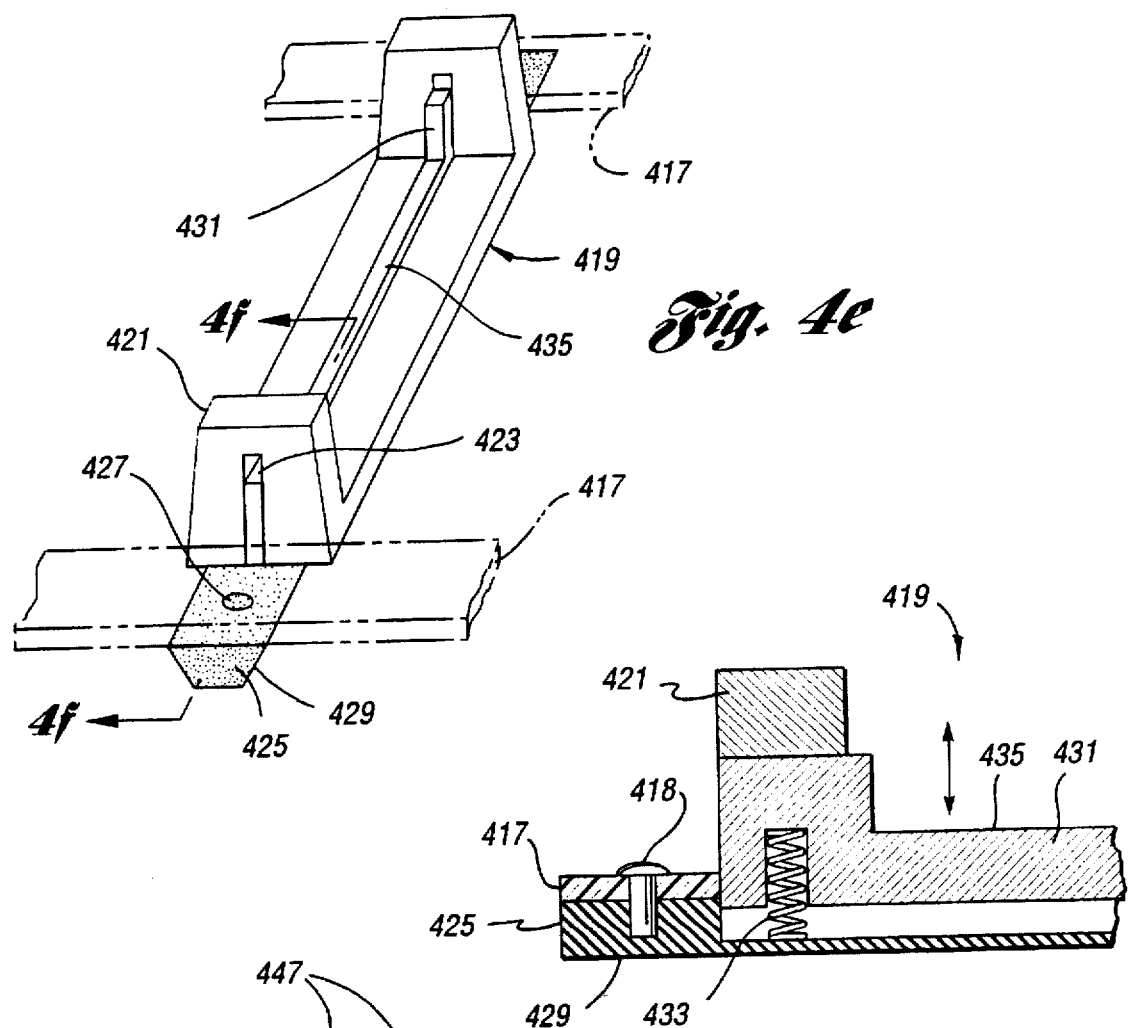
Fig. 4e
Fig. 4f
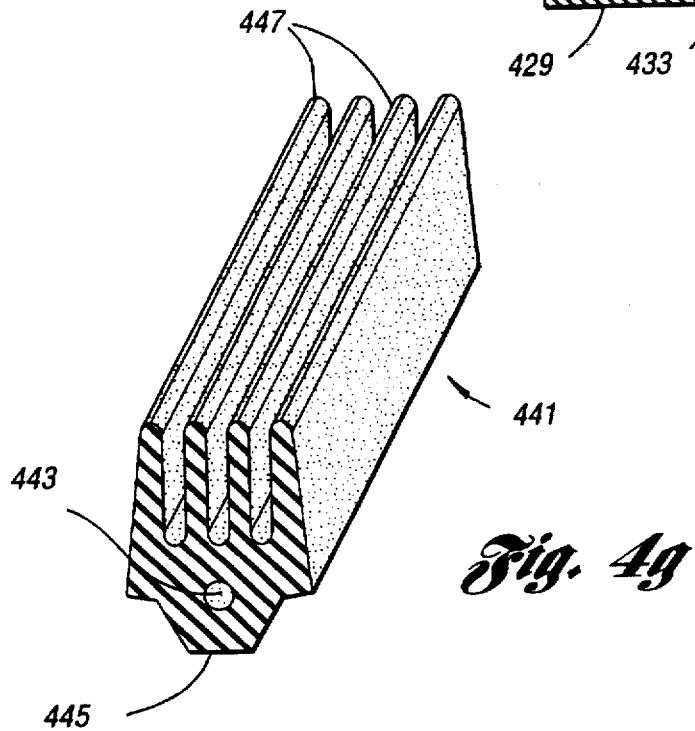
Fig. 4g

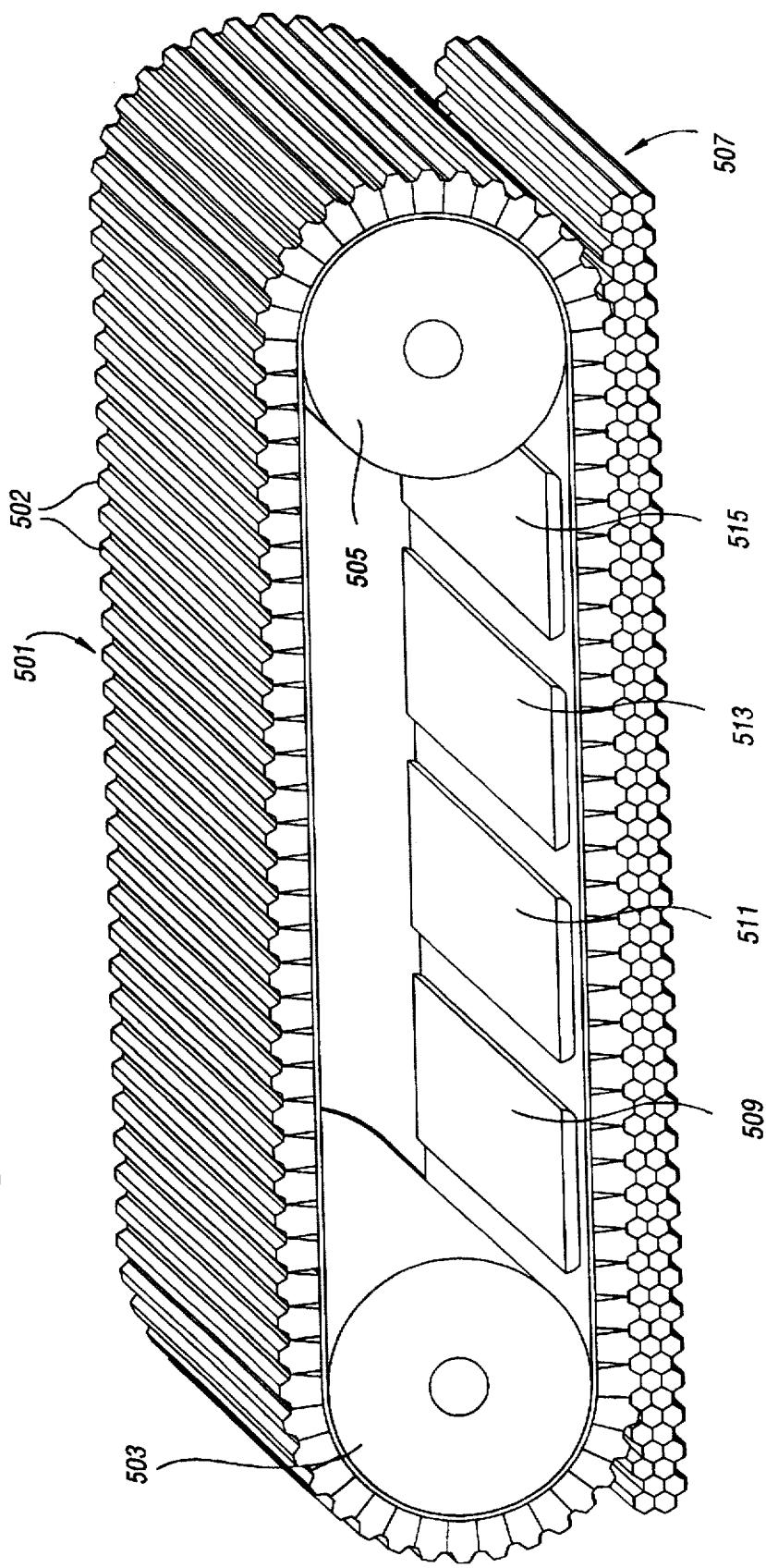

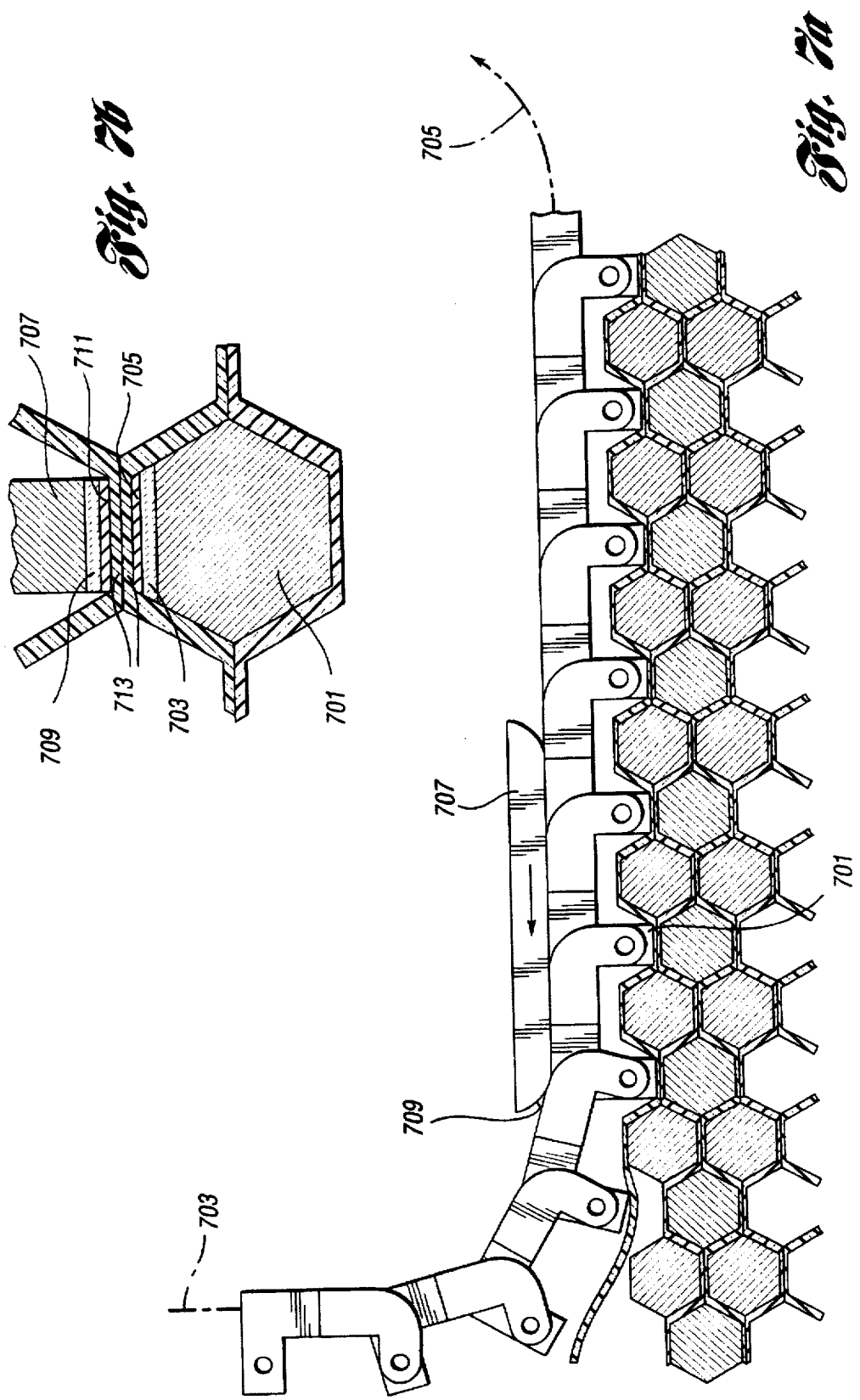

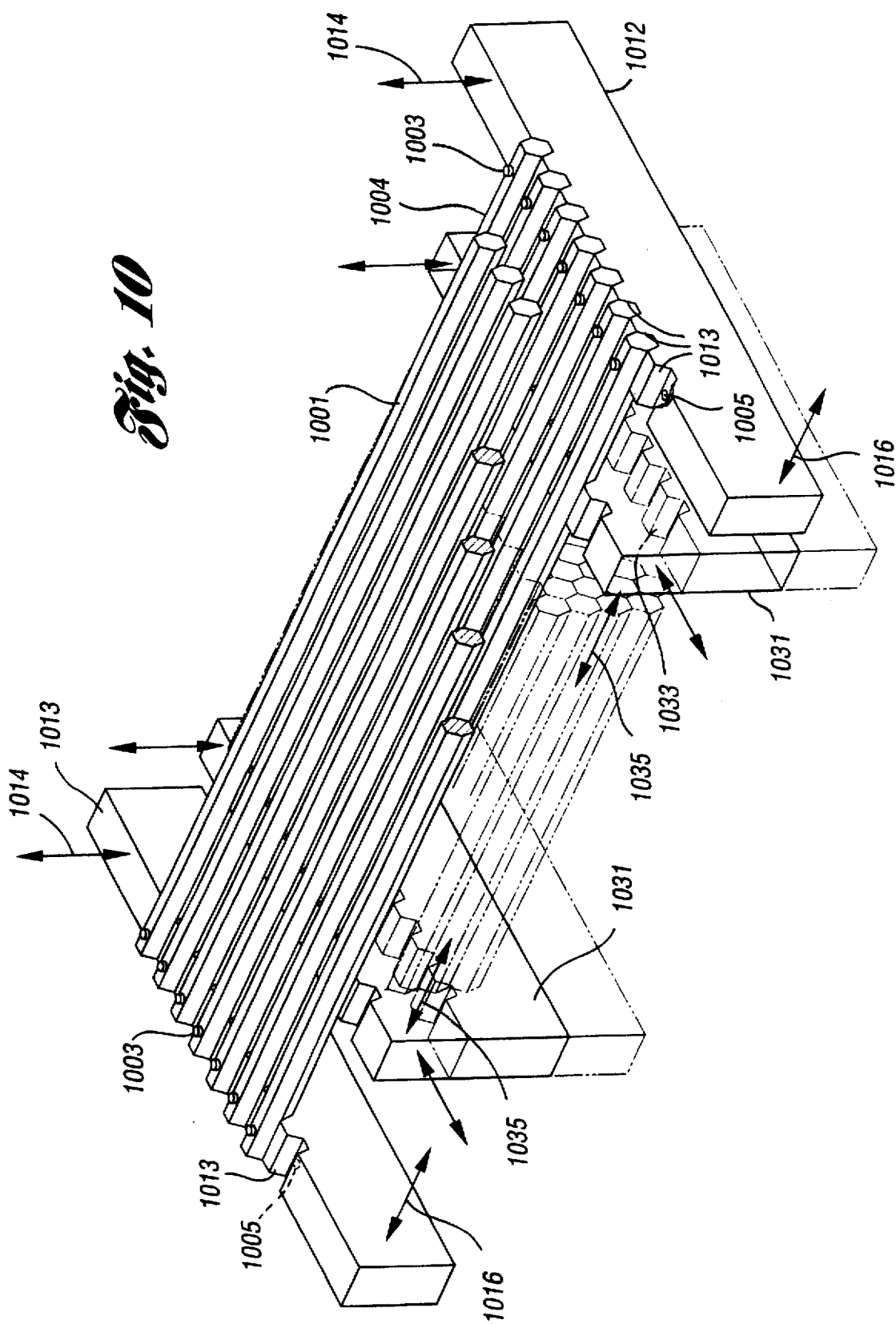

CONTINUOUS PROCESS FOR THE PREPARATION OF HONEYCOMB STRUCTURAL MATERIAL AND APPARATUS SUITABLE FOR USE THEREIN

TECHNICAL FIELD

The present invention pertains to a process for the continuous preparation of honeycomb structural materials of the non-expanded type. More particularly, the subject invention pertains to a process for the continuous preparation of honeycomb materials involving the sequential and selective bonding of node-to-antinode demes in successively applied half-cell honeycomb layers. The bonding is preferably accomplished by the use of a tractor-type belt which corrugates and then consolidates honeycomb material.

BACKGROUND ART

Use of honeycomb structural materials is becoming increasingly widespread. Applications include such diverse fields as aerospace manufacturing, cushioning heels for sports shoes, and furniture construction. Most of these uses rely on the high rigidity and load bearing capacity created when honeycomb material is sandwiched between suitable facing sheets.

Honeycomb materials may be divided into several categories depending upon such factors as their material of construction and mode of preparation. Materials of construction include paper, woven and non-woven glass and carbon fiber reinforced thermoplastics and thermosetting resins, thermoplastic films and woven materials, light metals such as aluminum, and steel.

Honeycomb may be roughly divided into expanded and non-expanded types. In expanded honeycomb, to which this invention does not apply, a "stack" is made of planar material, each successive sheet of material being bonded to the previously laid-down sheet along spaced, parallel bond lines. The bond lines between the sheet and those between the two previous sheets are staggered. The bonds may be a simple phenolic or other adhesive, as in the case of paper honeycomb, epoxy or other high performance adhesive in the case of fiber-reinforced material, or the bonding may be accomplished by thermal fusing or welding of thermoplastic and metal honeycomb, respectively. Following production of the stack, it is secured at the top and bottom surfaces and pulled apart to produce the honeycomb structure. In the case of paper honeycomb and the like, the stack may be fixed in its expanded form by being immersed in a thermosetting resin bath and the resin impregnated paper honeycomb cured while expanded. In the case of thermoplastic honeycomb, the core may be exposed to a sufficiently elevated temperature to remove any "memory" of the unexpanded condition, again fixing the core in the expanded condition.

For example, U.S. Pat. No. 5,277,732 discloses a process for the automated preparation of aluminum foil honeycomb where strips of aluminum foil having parallel, spaced apart adhesive strips, are indexed at the proper locations by sensing devices, the adhesive cured, and the stack expanded. In U.S. Pat. No. 4,957,577, thermoplastic honeycomb consolidated by thermal fusion is prepared in a process wherein metallic release substrates are assembled with a stack of thermoplastic strips at positions such that the heat required for thermal fusion of the topmost two strips along spaced bond lines to produce the necessary node-antinode bonds does not penetrate and fuse the second and third strips to each other. Following expansion of the core, the release substrates are removed. In U.S. Pat. No. 5,421,935, an improvement in the process of the '577 patent is achieved through elimination of the metallic release substrates. In the '935 patent, thermal fusion of more than just the top two stack layers along the node-antinode bond lines is prevented by carefully adjusting the temperature and duration of the fusion such that the antinodes in the topmost sheet are completely fused, but the penultimate sheet nodes directly below the topmost sheet antinodes are only fused to approximately 75% of the thickness of the thermoplastic.

The processes described above are not suited for a variety of high performance honeycomb materials for numerous reasons. Many desired materials of construction cannot be used with expanded honeycomb. Such materials include fiberglass and particularly carbon-reinforced polymer systems, where stack expansion results in wholesale fiber breakage or node bond breakage. The loss in strength offsets much of the performance advantage expected of these materials. Closely related is the fact that the expansion process creates stress at numerous points in the structure which affect the performance of even non-reinforced materials such as thermoplastics. Annealing thermoplastic cores may alleviate some of these stresses, however at the expense of increased process time and the risk of core distortion. The process of the '577 patent, with its many, thin, release substrates, does not lend itself to automated production, and the process of the '935 patent is highly sensitive to material and process parameters.

Non-expanded honeycomb is specified for demanding applications, particularly those which require the use of fiber-reinforced materials, whether due to their unique physical properties or electromagnetic properties such as may be required in so-called "stealth" products. However, non-expanded honeycomb of such materials has been notoriously difficult and time-consuming to manufacture.

For example, U.S. Pat. No. 3,356,555 discloses a method of preparing non-expanded honeycomb in which a fiber-reinforced polymer web is corrugated through the use of a squirrel cage roller and laid atop a bed of hexagonal bars. A second layer of hexagonal bars are placed in the antinodes of the corrugated web, and a second corrugated web, whose nodes are displaced from those of the first layer, positioned atop these bars such that the nodes of the first web are proximate the antinodes of the second web. This procedure is repeated with alternating layers one hexagonal bars and corrugated web until the desired core height is reached, following which the stack is pressurized between caul plates at the top and bottom of the stack and heated to fuse or cure the polymer system where the nodes and antinodes of successive layers abut. The hexagonal bars are then removed from the core by pulling them out or pushing with a thin pushrod. Great Britain Patent No. GB-A-2 188 166 discloses a similar process, as does U.S. Pat. No. 5,131,970.

The processes of the '555, '970 and like patents present many problems which prevent their widespread use. First, the many hexagonal bars which must be removed from the core following consolidation are difficult to remove without distorting or destroying the core. The thermoplastic and thermosetting polymers may stick to the bars, and even the application of release agents such as silicones is often not sufficient to eliminate this problem.

A further drawback is associated with the geometry of the rod/web layup. As the node-antinode demes are of double thickness due to the abutting of the two webs to be bonded, while the remaining honeycomb cell walls are only of single thickness, for proper consolidation, the hexagonal bars must be other than symmetrical in cross-section. Even when the proper geometries are achieved, a mere change in web thickness may require a different set of bars.

Consolidation of such corrugated stacks is also problematic, as it is difficult to achieve uniform consolidation without resorting to high pressure between caul plates. If too high a pressure is used, resin may be forced out of the node-antinode demes resulting in resin-starved areas not having optimal strength properties.

However, the greatest drawbacks to the use of batch core processes such as those described is the labor-intensive and part-count intensive preparation. For example, a four foot (1.2 m) length of honeycomb having a 0.125 inch (3.2 mm) cell width, and being only four cells in height, would require in excess of 1400 metal bars. The manual operations involved in assembling the stack result in extremely long fabrication times. It is not unusual, for example, for greater than 24 hours to be involved with the preparation of one cubic foot of honeycomb. Furthermore, the use of precorrugated sheets renders layup difficult. The corrugated material must be laid up such the antinodes of the top layer abut the nodes of the previous layer. However, corrugated sheets tend to nest instead, and thus application of each new layer involves a considerable amount of time.

To avoid the aforementioned extended preparation time, U.S. Pat. No. 5,296,280 discloses a method for preparation of adhesively bonded, non-expanded honeycomb. In the '280 patent, webs are corrugated and the nodes are antinodes of the respective sides coated with one part of a two-part cyanate resin/epoxy resin adhesive. The abutting nodes/corrugated webs are positioned such that the nodes and antinodes abut, and the stack, once prepared, cured at elevated temperature. The process disclosed in the '280 patent suffers from the necessity to use a tacky, thermosetting adhesive, which will not always provide the chemical and physical properties desired. The necessity for oven cure of the stack is also a drawback, not only due to the extra time and expense involved, but also due to the potential for core distortion during cure.

U.S. Pat. No. 5,354,394 purports to produce non-expanded honeycomb without prior corrugation of the honeycomb material. Materials disclosed for use include thermoplastic and fiber-reinforced thermoplastic webs. A stack of heating rods and mandrels is assembled with the web material intermediate to staggered layers of heated rods and the assembly compressed between caul plates. This method may be suitable for use with non-reinforced materials, but it is difficult to conceive how fiber-reinforced materials can be used, since the dimensions of the web after corrugation are considerably less than the linear length of the non-corrugated web. While non-reinforced thermoplastics may distort and flow to accommodate the difference in length transverse to the corrugations of the corrugated material, fiber-reinforced materials cannot do so.

In U.S. Pat. No. 5,139,596, the present inventor disclosed a process for the continuous preparation of honeycomb material by the repetitive forming of honeycomb one-half cell height at a time. In contrast to batch methods, the process of the '596 patent allows continuous production of honeycomb from a variety of materials. The process of the '596 patent involves the use of but two sets of retractable, displaceable former bars, one set being disposed within the topmost row of complete honeycomb cells, the second set being disposed in the antinode depressions of the top face of the honeycomb. A corrugating roller corrugates and bonds a polymer-containing web simultaneously as it traverses across the length of the honeycomb in a direction transverse to the axis of the corrugations. The heat source is a non-contacting heat source such as a hot shoe out of which flows a stream of hot gas. The gas stream is directed toward the bottom of the uncorrugated web and the top of the honeycomb. The web, softened by the heat, is corrugated and immediately fused to the top of the honeycomb by the roller which presses the heated web and core antinodes and nodes together. The lower-most set of formers are then retracted and positioned on the top of the core, and the process repeated.

The process of '596 has numerous advantages over prior processes. Only two sets of former bars are required, their number and size dictated by the width and length of the honeycomb, and not by its height. The process is also rapid, does not require a separate adhesive, and does not require an oven cure. The process has the drawback, however, of permitting only a limited time of pressurized contact between the node-antinode demes. As the heat source is a non-contacting heat source, the heat supplied must often be excessive in order that sufficient heat remain to fuse the node-antinode surface. Production of honeycomb cores from thin, woven thermoplastic webs and thermosetting webs are problematic, the former due to melt through at the node-antinode demes or during corrugation, the latter due to insufficient consolidation time to cure the thermoset resin.

U.S. Pat. No. 5,399,221 discloses a process using an apparatus in some ways similar to that of the '596 patent in that the use of a pair of retractable former bars are used. However, in the '221 patent, the web is precorrugated and indexed over the rods, following which a heated platen presses down from above, fusing the node-antinode demes. An advantage of the '221 patent is that the temperature required for corrugation is completely independent of the consolidation temperature. A further advantage is that the platen may exert pressure over a longer time period and may also be alternatively heated and cooled. However, the '221 process has the disadvantage that fully corrugated sheets must be accurately indexed, an operation known to those skilled in the art to be difficult to perform in a reproducible manner. A further disadvantage is the difficulty of maintaining uniform pressure of the platen against the surfaces to be bonded across the length and width of the core. Thus, some portions of the core will be bonded more fully than others, producing a non-uniform material. This disadvantage is particularly important for large core widths.

It would be desirable to provide a non-batch method for the continuous preparation of non-expanded honeycomb core having uniform properties. It would be further desirable to provide a process which can successfully employ many core materials such as paper, fiber-reinforced thermoplastic and thermosetting webs, non-reinforced thermoplastics, and metals, these with or without added heat-curable adhesives, while providing a strong node-antinode bond. It would further be desirable to provide such a method where the corrugation temperature and bonding or consolidation temperature are substantially independent, and where each node-antinode may be selectively subjected to different and controllable temperature cycles over extended periods of time. It would further be desirable to provide a continuous process which does not employ precorrugation.

SUMMARY OF THE INVENTION

It has now been surprisingly discovered that the aforementioned objects and others may be achieved by progressively and selectively forming, heating and cooling a web suitable for the preparation of honeycomb core using a multiple tooth assembly on a flexible belt to perform corrugation and consolidation of the web material over retractable sets of formers.

BRIEF DESCRIPTION OF THE DRAWINGS

FIG. 4e illustrates a tooth having a resistive heating element slidable within the tooth;

FIG. 4f is a cross-section of FIG. 4e over section F—F;

FIG. 4g illustrates a tooth capable of being heated or cooled by a stream of fluid;

FIG. 5 illustrates a continuous belt containing first through fourth pressure platens with temperature adjusting means;

FIG. 6d illustrates a platen having electrical contacts suitable for use with resistive heated teeth as in FIG. 4a;

FIG. 7a illustrates a partial belt of articulated links suspended above a core and urged against the core by a pressure platen;

FIG. 7b illustrates a former bar and tooth of RF energy transmissive material coated on their proximate surfaces with dielectric material and optional release coatings;

FIG. 9d illustrates in enlarged view, the interaction of the teeth of a traveling belt with the web being corrugated/consolidated and the former bars of the bed unit;

FIG. 10 illustrates an embodiment of a bed unit having free floating former bars and positioning and clamping rails;

DESCRIPTION OF THE PREFERRED EMBODIMENTS

The basic honeycomb production apparatus of the subject invention comprises a bed unit and a corrugation/consolidation unit, both of which may be integrated into a single apparatus together with additional components such as adhesive applicators, contacting and non-contacting heat sources, temperature monitoring devices, computer control devices, etc.

The bed unit contains minimally two sets of retractable former bars, preferably constructed of metallic material, as disclosed in U.S. Pat. Nos. 2,821,616; 3,823,118; 5,139,596; and 5,399,221, which are herein incorporated by reference. The former bars have a length which is dictated by the width of the honeycomb core desired to be produced, i.e., minimally the distance from one edge of the core to the opposing edge in a direction parallel to that of the corrugations plus the length required to mount and/or support the bars. Preferably, the length is somewhat longer than the width of the core such that the free ends of the former bars may enter and/or be supported by corresponding holes or support structure in the apparatus on the opposite side of the core.

The cross-sectional shape of the former bars may be hexagonal, with dimensions similar to those of the cells in the core to be produced, may be distorted hexagonal, with the top and bottom surfaces corresponding to the width of the antinodal and nodal corrugations or a substantial fraction thereof and the diagonal sides of slightly lesser size to establish a minor clearance between the rods and the sides of the honeycomb cell walls which are not to be bonded and thus require no former/cell wall contact, or may be square or rectangular, the upper and lower faces again corresponding to the width of the faces of the corrugated web to be bonded or a substantial fraction thereof, and the non-contacting faces corresponding to the cell height. Other former shapes and cell shapes are possible as well.

Figure 1:
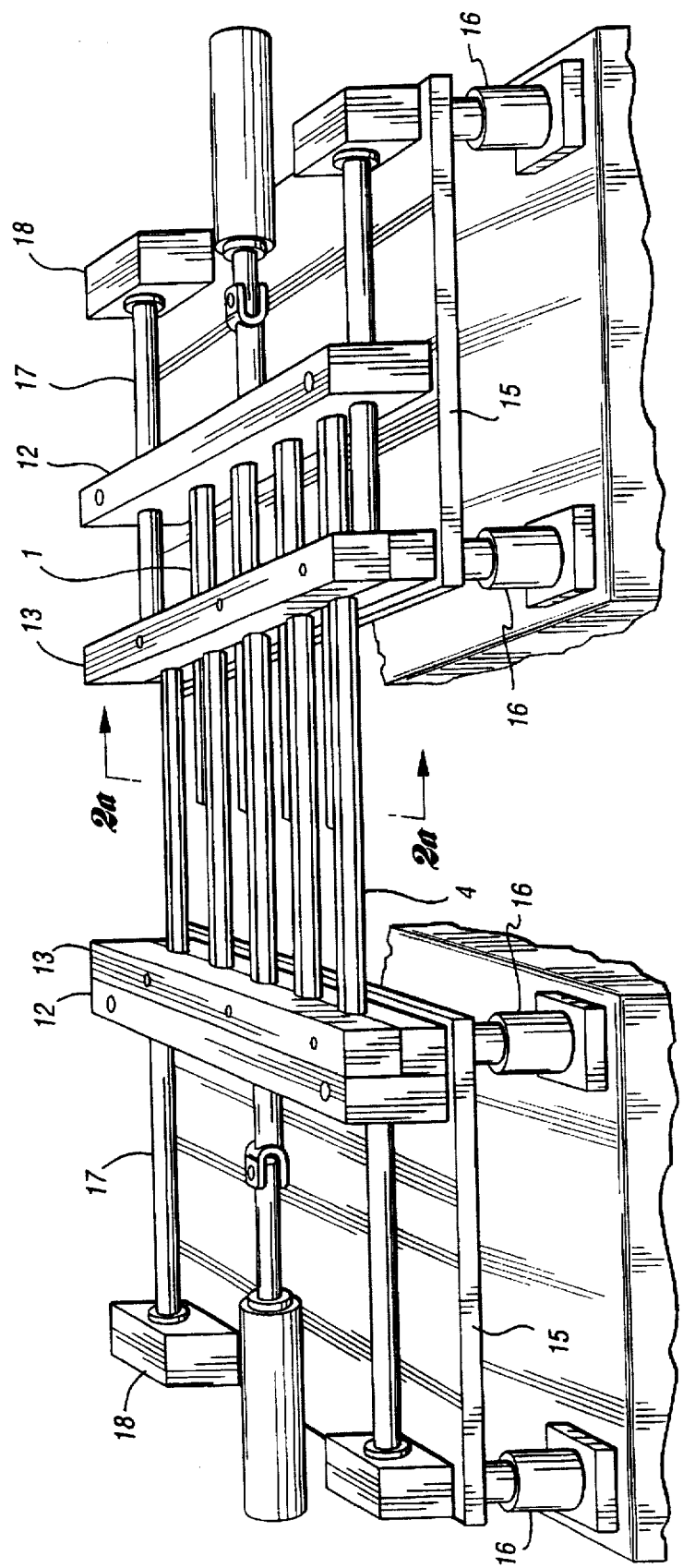
FIG. 1 is an illustration of a bed unit having two sets of retractable former bars.

With reference to FIG. 1, the lowermost formers 1 are secured by securing blocks 12, and inserted through the top layer of cells of a preformed honeycomb starter into or onto the bed rails 13. Means of insertion may be by electric servo motor, by pneumatic or hydraulic motors or rams, or other equivalent means. Topmost formers 4 are then inserted on top of the honeycomb with the formers occupying the antinode depressions in the top of the honeycomb core. Means for inserting and retracting the rods (formers) and for raising and lowering them will readily suggest themselves to one skilled in the machinery arts. Further description of suitable methods may be found, for example, in U.S. Pat. No. 3,283,118 which is herein incorporated by reference. A web (not shown for clarity) is corrugated above the topmost rods such that the antinodes of the corrugated web are in contact with the nodes of the honeycomb topmost layer. At least the node-to-antinode surfaces (demes) of the topmost portion of the core and the just-corrugated web are heated, and pressure exerted to fuse the node to antinode surface. The lowermost set of formers are then withdrawn, raised, and inserted into the antinode depressions of the newly formed top row of honeycomb cells, becoming the topmost set of formers in the process. As a result, the honeycomb has been increased in size by one-half cell.

Further with reference to FIG. 1, the height of both sets of metal formers (1 and 4) may be adjusted by raising or lowering the height of the bed frame 15. Various means may be used to accomplish such raising or lowering, such as the use of hydraulic or pneumatic pistons 16. The former bar securing blocks 12 may be free floating, may be hinged, but preferably are regulated in their motion through the use of linear bearings 17 attached to pillar blocks 18. Other equivalent means of raising and/or lowering the formers will readily suggest themselves to one skilled in the art.

After the topmost corrugation has been fused to the existing honeycomb, the lowermost bars 1 as previously stated, are withdrawn, raised by pistons 16 to a height such that the bars may clear the thickness of the most recently fused node-antinode surfaces, and reinserted, becoming the topmost formers in the process. Both bed frames are then lowered by one-half cell height and the now topmost bars optionally lowered slightly to establish pressure between the two sets of formers and the honeycomb material located between them. The raising and lowering sequence may be varied as long as the final result is the same or its equivalent.

Figure 2A:
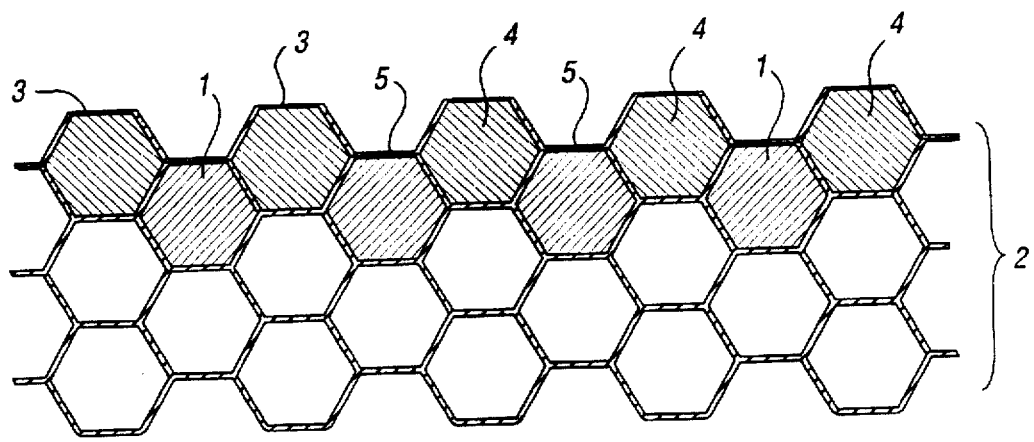
FIGS. 2a to 2c illustrate the sequence of honeycomb construction beginning with one complete cell height of starter core.
Figure 2B:
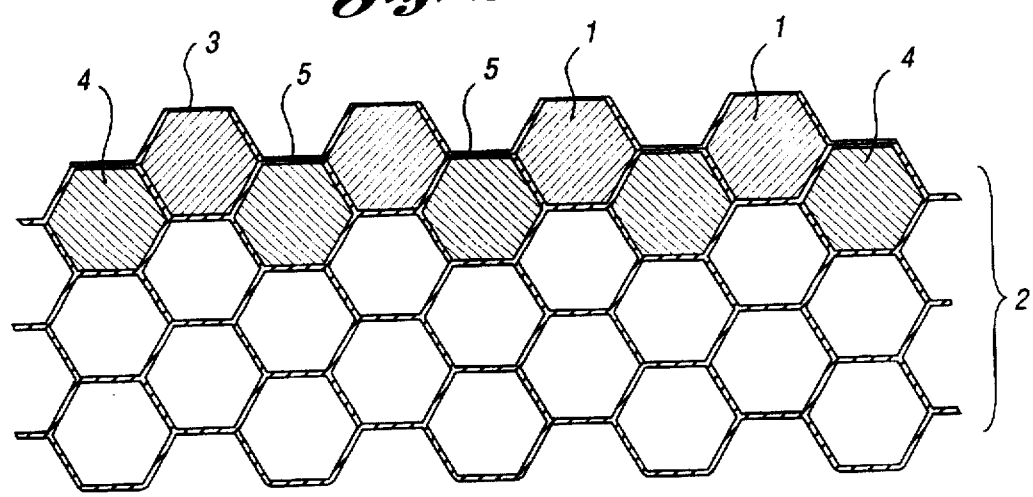
Figure 2C:
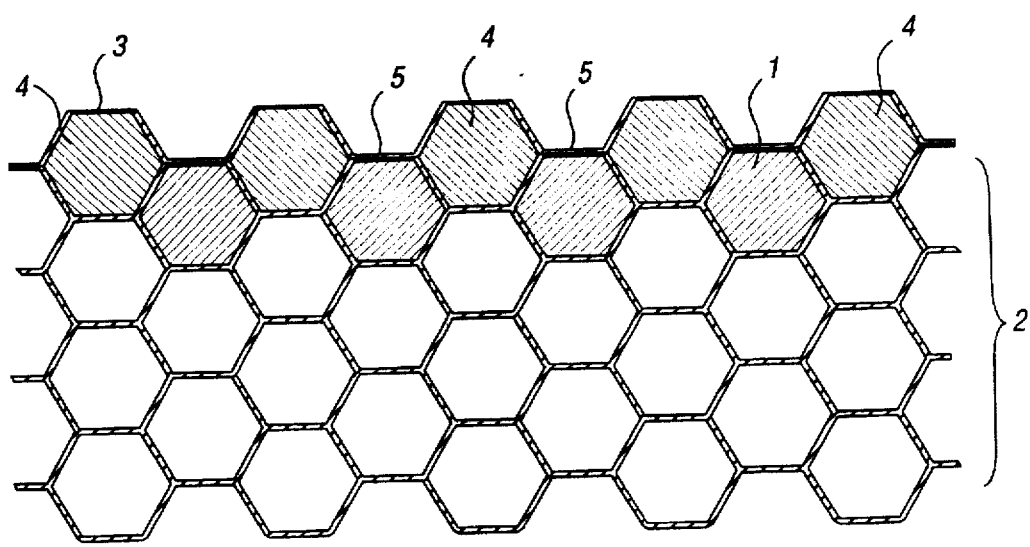

The honeycomb forming sequence is shown by FIGS. 2a–2c, which are a section taken through FIG. 1 across 2a but with honeycomb material in place. In FIG. 2a at 1 are the lowermost row of bars or formers which are located in the topmost cell layer of a honeycomb 2. The topmost row of formers 4 is inserted into the antinode depressions and optionally clamped down trapping the honeycomb 2 between the lower 1 and topmost 4 formers. A layer of corrugated fiber reinforced thermoplastic web, thermosetting resin-impregnated fibrous web, corrugated unreinforced web 3, or the like which may also be a metal foil, is laid atop the topmost bars 4 and consolidated at the node-antinode depression demes 5. The lowermost formers 1 are then withdrawn, raised by an amount equal to or greater than the consolidated node-antinode deme thickness and reinserted, resulting in FIG. 2b.

In FIG. 2b, the numbering of FIG. 2a has been retained. Note that the lowermost formers 1 of FIG. 2a have become the uppermost formers 1 of FIG. 2b while the uppermost formers 4 of FIG. 2a are now the lowermost formers 4 of FIG. 2b and the honeycomb 2 has been increased in width by one-half cell. Another layer of corrugated web is laid down, consolidated with heat and/or pressure, and the lowermost formers 4 withdrawn, elevated and reinserted, once again becoming the topmost formers 4 in FIG. 2c (as also in FIG. 2a), but note that the honeycomb structure 2 in FIG. 2c has now been increased in width by a full cell. This process is repeated until a honeycomb of the desired height is created.

The minimally two sets of formers must retract from the core and be raised and/or lowered, as the case may be, to shuttle the two sets of formers between the topmost position to the bottommost position. These formers must, therefore, have two degrees of freedom, one in the direction of insertion/retraction, and one up and down, i.e. in the direction of core height, orthogonal to the exposed topmost surface of the core.

For cores with great width, requiring longer former bar length, the possibility of distortion of the portion of the core toward its center due to bending of the rods during corrugation/consolidation, exists. To eliminate or minimize such distortion one or more means may be employed. In one such distortion eliminating means, one or both ends of the formers may be provided with an annular shoulder or recess adapted to receive a locking flange or collar located in the support rails. Upon arriving at the desired insertion distance, with the free ends of the bars located in receiving holes in the bed rails, a locking device, for example a pair of metal strips, each having half-circular cut-outs corresponding in diameter less than the dimensions of the former bar and equal or greater than the diameter of the annular recess in the bar, clamp over the bars from opposing directions. The former bars are no longer capable of distorting by bending and withdrawing from the receiving holes in the bed rail. If the bars are to distort to any great extent, the bed rails themselves must be drawn inward. As the bed rails may be made quite substantial in size and strength, bending is minimized.

A further means of reducing distortion of the former bars through bending is the employment of a third and/or fourth set of former bars. These former bars, which may be termed "support bars" due to their function of supporting rather than forming the core, are located in the row or rows of cells immediately below the lowermost set of former bars. These bars also retract, as do the former bars, but rather than moving up and down, interchanging roles as topmost and bottommost former bars, the support bars may simply reciprocate between positions one-half cell width apart but in the same plane, i.e., in a direction parallel rather than orthogonal to the top honeycomb surface. The additional support provided by the support bars will also substantially minimize bending distortion of the former bars. Either optional means of bending distortion elimination may be used, or both may be used together. The former bars may advantageously be coated with a release coating such as PTFE.

In a preferred embodiment of the bed unit, the former bars, rather than being inserted into holes in the opposing rails as shown in FIG. 1, and rather than being fixed in position in the securing blocks, are instead free floating bars secured to the top of the supporting blocks by a pin and groove arrangement. In FIG. 10, a portion of the former bars have been removed for clarity. Supporting blocks 1012 and 1013 are grooved along their topmost surface with recesses 1013 adapted to locate the former bars in the direction perpendicular to the length of the former bars 1001, 1004 in the axial direction. The recesses 1013 have a hole 1005 to receive locating pins 1003. The holes 1001 in the former bars are slightly larger, at least in the axial direction, than the diameter of locating pin 1003 such that the bars may tilt to either lower or raise the end of the former bar most remote from the support blocks. The ability of each former bar independently to float, tilt, lift, or otherwise travel in a vertical plane allows the apparatus to compensate for minor errors in core geometry, web thickness, and the like, which otherwise might accumulate over the length of the core, presenting unacceptable alignment in cores of substantial size. The former bars may also be supported in similar fashion by other securing means, for example, by a hinge at the support bar end of the former bar, such a hinge having substantially one degree of freedom in a vertical plane which incorporates the rod axis. By the term "floating securing means" is meant a means of attaching the former bars to a support bar or structure which allows for the tilt of one or a small group of former bars independent of other former bars or sets of former bars. The double-headed arrows 1014 and 1016 indicate the degrees of freedom of the support rails, which, in the drawing, move into and away from the core in the directions 1016 to insert or retract former bars, and in the directions 1014 orthogonal to the plane of the former bars to lower or raise the latter.

The apparatus shown in FIG. 10 further contains a former bar positioning means, which preferably also serves as a core clamping and positioning means. As shown in FIG. 10, clamping rails 1031 lie between the supporting blocks 1012 and 1013 of the bed unit. The clamping rails 1031 contain on their upper surface recesses 1033 adapted to locate the lowermost former bars 1004 in the correct position. For use with the preferred hexagonal former bars, for example, the recesses preferably take the form of a half hexagonal groove.

The clamping rails possess two degrees of freedom, one, 1035, in the direction of the axial length of the former bars to position and clamp or unclamp the core being formed, the other, 1037, in the direction parallel to the support blocks, to reciprocate the clamping rails one-half cell length or odd multiples of one-half cell length to accommodate the other set of former bars 1001 as core is being formed.

The clamping rails are driven inward by suitable actuators, for example, pneumatic or hydraulic pistons or mechanical linkage, such that the core is firmly supported by the clamping rails. The close proximity of the clamping rails to the core and its support up to the mid plane of the lowermost former bars facilitates retraction of the former bars without damage to the core. The clamping rails 1031 are shown in shadow in a lowered position so that the recesses 1033 may be clearly seen. However, the rails 1031 require no movement in this direction.

In operation, after the laying down of a new half-cell height of honeycomb, as will be hereinafter described in greater detail, the lowermost former bars will be retracted from the core. The clamping rails 1031 will then move away from the core, allowing the core to move vertically. The clamping rails then shift one-half cell length in the direction perpendicular to the core corrugation axis, and the uppermost former bar support block 1013 is lowered by one-half cell height such that what were formerly the uppermost former bars now become the lowermost former bars, and rest in the recesses 1033 atop the clamping rails 1031. The retracted former bars 1004, formerly the lowermost former bars, are raised and reinserted, nesting atop the now lowermost former bars and the web lying atop these bars. The clamping rails are once again energized, to both position and support the core. A further layer of web is laid down, and the former bar retraction, clamping rail unclamping, former bar lowering, and other steps described above repeated. As the process continues in rapid fashion, core is continually formed one-half cell height at a time, and the core may be seen visually moving down from the machine.

The machine bed unit thus described has a great deal of flexibility and is able to produce cores of materials which would otherwise create problems, particularly with rod retraction. With some materials, adhesion of the former bars to the web creates such stress upon retraction of the rods that the core may literally be torn apart. By clamping the core between the clamping rails, whose height extends halfway up the height of the last full row of cells from which the rods must be retracted, the high degree of sideways support minimizes the potential for core damage.

Having now described the bed unit, the corrugation/consolidation unit comprises a mechanism whereby consolidation of the web material takes place substantially independent of consolidation, but progressively associated therewith. Unlike prior art methods employing pre-corrugation, resulting in difficult to handle corrugated materials which are layered up into core at some later time, the corrugation in the subject invention precedes consolidation by such a short space of time and distance that handling problems are eliminated. On the other hand, corrugation and consolidation are not performed simultaneously, with the advantage that corrugation and consolidation temperatures may be quite different.

To accomplish the substantially independent but progressive corrugation/consolidation of the subject invention, a toothed belt, portion thereof, or equivalent device is employed for corrugation/consolidation. The belt contains a plurality of teeth or anti-teeth as hereinafter defined. The contacting, extending teeth or anti-teeth of the toothed belt may be individually heated and/or cooled, thus allowing selective thermal cycling of the teeth, while the progress of the toothed belt across the upper surface of the core allows not only for extended consolidation periods, but also allows for cooling of the node-antinode demes prior to removal of consolidation pressure, especially important with thermoplastic materials.

In its simplest form, the corrugation/consolidation unit of the present invention may comprise a continuous toothed belt, which may be likened to a tractor tread having protruding elongate teeth. Each tooth which will contact the honeycomb and participate in the consolidation phase of honeycomb preparation preferably has a temperature adjusting means associated therewith to apply heat or remove heat as desired.

Figure 3:
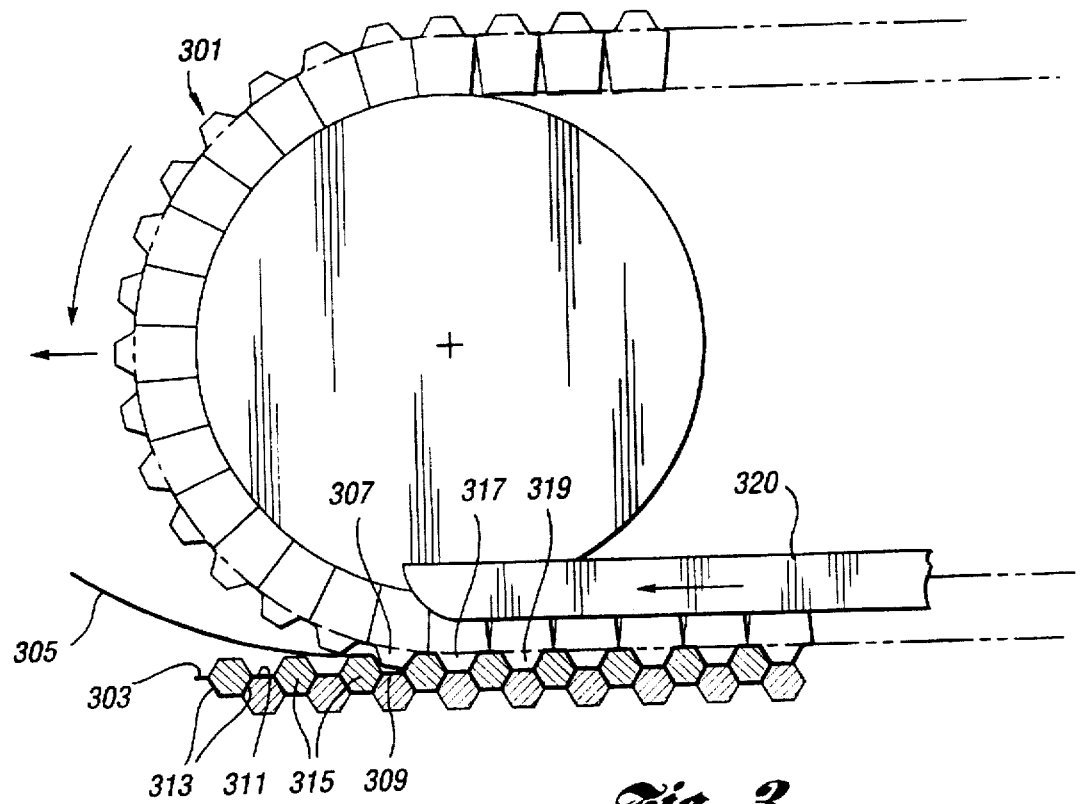
FIG. 3 illustrates the use of a traveling belt with individually temperature controlled teeth for the progressive but independent corrugation/consolidation of honeycomb core.

In operation, with reference to FIG. 3, as the toothed belt 301 traverses the honeycomb top surface, it corrugates non-precorrugated web material 305 between the leading, contacting tooth 307 of the belt and the antinode 309 of the previously laid web 311, surrounded and occluded on its diagonal flanking sides 313 by the topmost row of former bars 315. As the toothed belt continues to traverse the honeycomb from right to left in FIG. 3, the corrugating tooth becomes a stationary consolidation tooth, for example as shown at 317 and 319. Each tooth is associated with a temperature adjusting means as described in greater detail below. As the temperature of each tooth or a defined set of teeth may be adjusted independently of other teeth or sets of teeth, the temperature may be adjusted to be optimal with respect to the materials used. Platen 320 is used to urge the teeth against the web and core and additionally may contain temperature adjusting means.

As can be readily ascertained, the dwell time of each tooth upon the node-antinode deme to be consolidated may be adjusted by altering the traverse speed of the toothed belt across the core face, or by altering the length of the belt itself. For example, a toothed belt containing 20 teeth will have double the dwell time of a belt having 10 teeth. As the dwell time is lengthened, the temperature differential between the portions of core being consolidated and the teeth may be lowered as well. This is particularly important for some polymers which, because of their heat sensitivity, cannot stand the higher temperature differential which would be required with a short dwell time.

For web materials which are fiber reinforced or otherwise prone to breakage when cold-corrugated, a means of heating the web immediately forward of the leading, or corrugating tooth, may be employed. As the consolidation of the web is independent of the corrugation, the temperature of the web immediately prior to corrugation may be higher or lower than the consolidation temperature, as the heat supplied at this point is only for the purpose of corrugation and does not have to be of a sufficient quantity to enable consolidation as well. Heating means which may be employed prior to corrugation include, but are not limited to, hot air jets, radiant energy, particularly infrared energy, microwave energy, and equivalent forms of non-contacting thermal energy sources. Contacting energy sources such as heated nip rolls, bars, platens, and the like may be used, as well as combinations of both non-contacting and contacting energy sources. In many cases, the leading or corrugating tooth itself may be heated by a tooth temperature adjusting means, and thereby supply the necessary heat to promote corrugation.

Minimally one pressure applying means is necessary to supply pressure between the teeth on the belt and the core. This pressure applying means, in the case of large cores with heavy toothed belt units, may simply be the weight of the belt due to gravitational attraction normal to the core face. However, as most belts have little rigidity over the portion of interest, i.e., that portion of the belt where teeth contact the core, it is in general necessary to contain within the belt one or more rollers, or preferably pressure rails, plates, or platens (320 in FIG. 3) which urge the belt against the core. If the belt elements are contained within a rigid track, then hydraulic or pneumatic pressure, mechanical force, magnetic force, electromagnetic force, or added ballasting weight may be used as the pressure applying means. Other means of providing the desired pressure will readily suggest themselves to one skilled in the art of machine design.

Figure 4A:
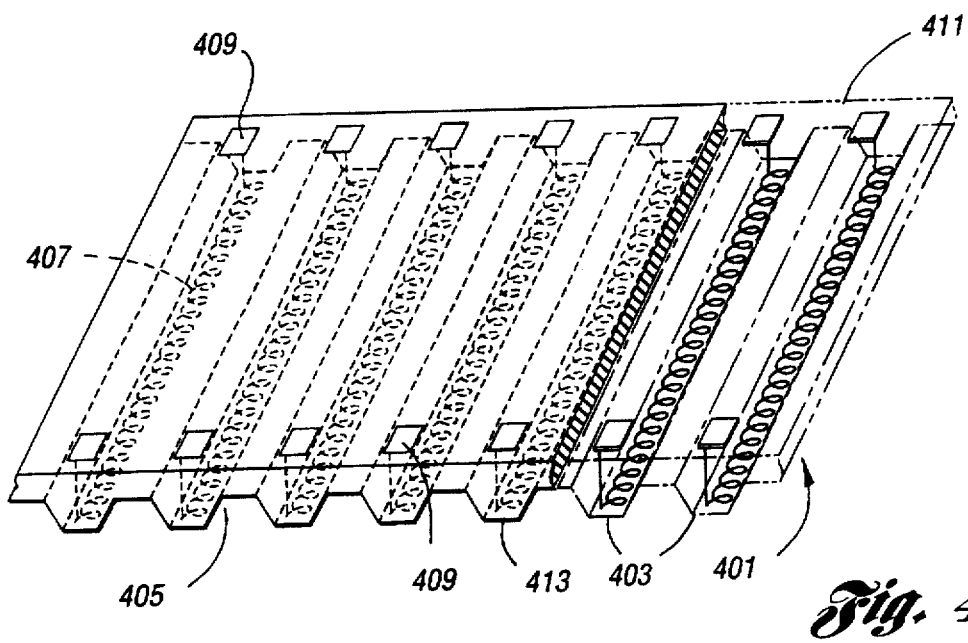
FIG. 4a illustrates a toothed belt having contained within the teeth resistive heating elements.
Figure 4B:
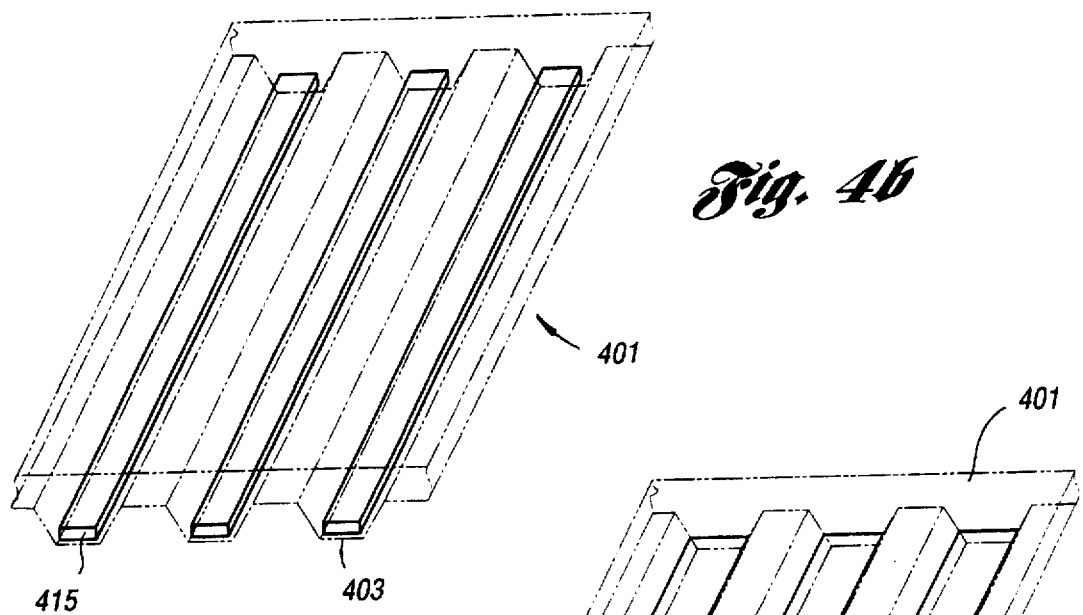
FIG. 4b illustrates a toothed belt having inductively heatable elements.

The temperature adjusting means for individual teeth or groups of teeth may take several forms. For example, as shown in FIG. 4a, each individual tooth may contain a resistive heating element embedded within the tooth. Alternatively, the tooth itself or a portion thereof may be constructed of or may contain an element which may be inductively heated, as shown in FIG. 4b. A heat resistant elastomer belt, for example of heat-stabilized silicone rubber, is shown in FIG. 4a. The silicone rubber belt 401 is cast to contain the necessary projecting teeth 403 on its outer surface 405. Embedded within each tooth is a coil of resistance heating wire 407, the ends of which are brought out to electrical contacts 409 which are exposed along the inner surface 411 of the belt. If the silicone belt material does not have the release properties desired, the entire outside surface 405 of the belt, or the lower, contacting surface 413 of the teeth may be coated with a release coating, e.g. PTFE.

With respect to FIG. 4b, a rubber belt similar to that illustrated in FIG. 4a dispenses with the resistance heating elements and their associated contacts, and utilizes instead an embedded strip or rod of an inductively heatable material, for example a metal strip or ceramic ferrite strip or bar. In FIG. 4b, the inductively heatable metal strip is shown at 415. The inductively heatable strips are energized singly or in groups by induction heating coils preferably located in one or more pressure platens or carried in non-pressuring elements traveling within the belt in the direction of belt progression.

Figure 4C:
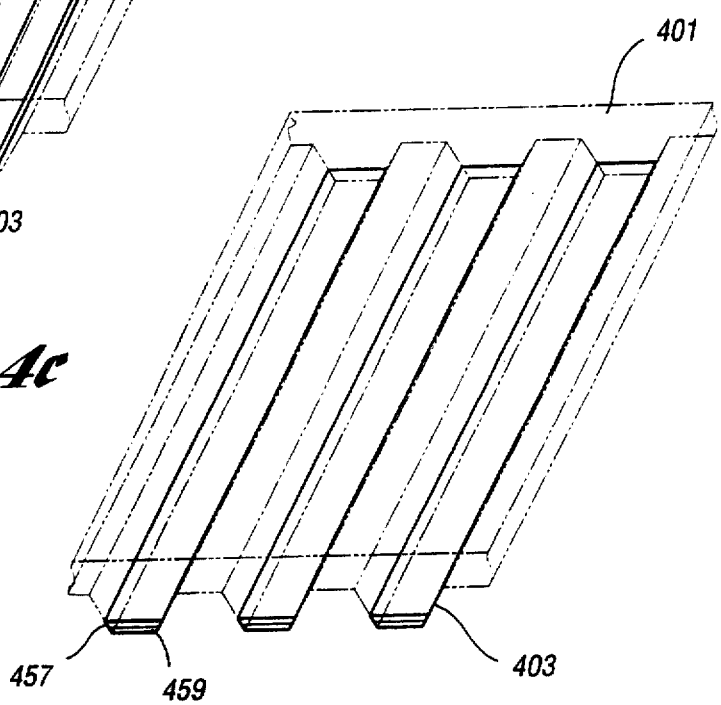
FIG. 4c illustrates a toothed belt having inductively heatable coatings superficial to the bottom, web-contacting surface of the teeth and an optional release coating.
Figure 4D:
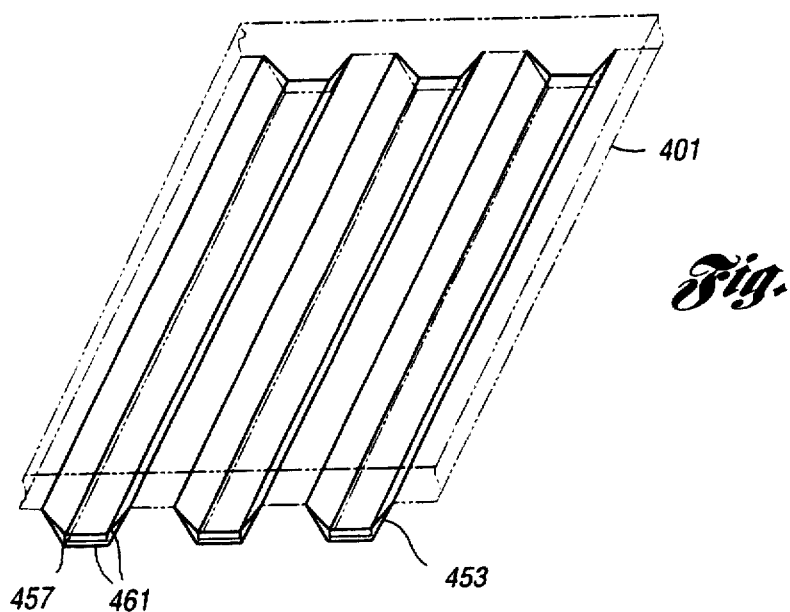
FIG. 4d illustrates a toothed belt similar to FIG. 4c wherein the release coating covers the side walls of the teeth in addition to the web-contacting surface.

In FIG. 4c is an alternative embodiment of an inductively heatable toothed belt. In this case, the belt 401 may again be made of silicone rubber having projecting elongate teeth 403. However, the bottom contacting surface is coated with a superficial contacting coating 457 loaded with an inductively heatable powder such as a ferrite, e.g. barium ferrite or strontium ferrite, or a metal powder. In further embodiments also illustrated in FIG. 4c, a release coating 459 may be applied superficial to inductively heatable coating 457. This coating may also extend up the flanking walls of the tooth, as shown at 461 in FIG. 4d. However, the inductively heatable coating 457 is preferably limited to the bottom surface of the tooth, unless for some reason, the diagonal walls of the honeycomb are desired to be heated as well as only the node-antinode demes, for example if it is desired to cure a thermosettable matrix resin in fiber-reinforced web instead of a rubber material, other materials which themselves cannot be inductively heated, or can be so heated only at low efficiency may be used in conjunction with an inductively heatable material or element.

FIGS. 4e and 4f illustrate a tooth designed to be linked together into a belt, each tooth containing heating element slidable within the tooth. FIG. 4f is a cross-section along F—F of FIG. 4e. Two belts 417, which, for example, may be of fiber reinforced elastomer or metal, are used to mount a plurality of tooth/heating units 419. Each unit 419 comprises two pedestals 421 containing slots 423 extending along a direction transverse to belt progression, and an extension 425 or equivalent device to enable the unit 419 to be mounted to the belts by bolts 418 or other fasteners into holes 427 in belt 417. Along the bottom of the tooth/heating unit, the unit is configured into a tooth shape to provide a tooth 429, which may advantageously be carried out laterally as extension 425. The elongate tooth, like the pedestals, contains a slot, this slot extending through the bottom surface of the tooth. A retractable heating device 431 slides within the slots in the pedestals and the tooth, perpendicular to the tooth bottom surface. This heating device 431 may be urged away from the bottom surface of the teeth and the core being formed by springs 433 located in each pedestal. The heating device may be an inductively heatable material, may contain a resistive heating element, or may simply be made of thermally conductive metal, the heating being supplied by a hot shoe which travels within the belt, against upper surface 435 of heating device 431. In operation, as the heat supplying device travels within the belt (refer to FIG. 3), the slidable heating devices 431 are urged against the spring pressure holding them away from the tooth surface and further into the slots in the tooth, until the heating device makes contact with the web being corrugated or consolidated. As the platen containing the heat source travels past the tooth, the heating device 431 retracts away from the core, while the remainder of the tooth may remain above the core, allowing the web being consolidated to cool under pressure, while the heating device itself still remains at an elevated temperature due to its thermal inertia. Alternatively, the same elements as previously described may be adapted to a linkable tooth element similar to those shown in FIG. 9B.

In a further embodiment as shown in FIG. 4g, a jet of hot (or cold) air may be used to adjust the temperature of the tooth. In FIG. 4g, a perspective view of a portion of an air heated/cooled tooth 441 is shown. The tooth can be mounted to a holder or linked belt by bolts or other devices by hole 443 machined in each end of the tooth. Heat is supplied or removed from the bottom, contacting surface 445 of the tooth by thermal conduction through the tooth to or from fins 447, used for the purpose of increasing thermal transfer efficiency. The fins may be replaced by a simple extension, or, in the case of low melting thermoplastics, by a flat or other configured top surface. The teeth may be heated by a stream of hot fluid, e.g. gas, directed towards the fins, and may be cooled either by removal of the hot air supply coupled with simple radiation of heat from the fins, or by means of a stream of cooler fluid.

Figure 6A:
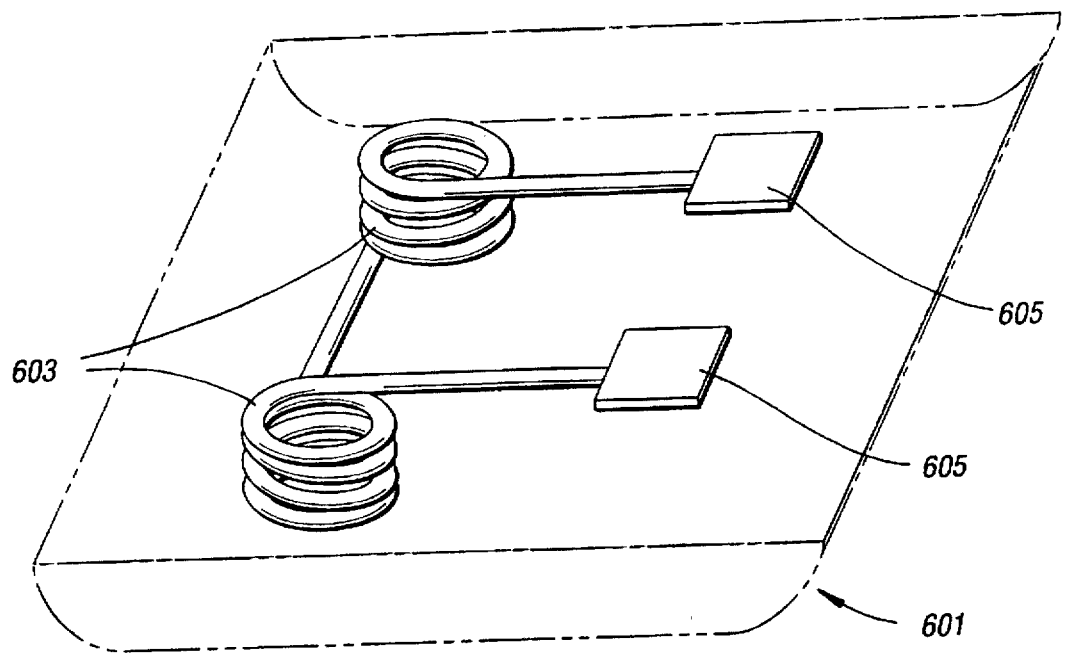
FIG. 6a illustrates a platen containing a single induction coil for inductively heating one tooth or a defined set of teeth located below the platen.
Figure 6B:
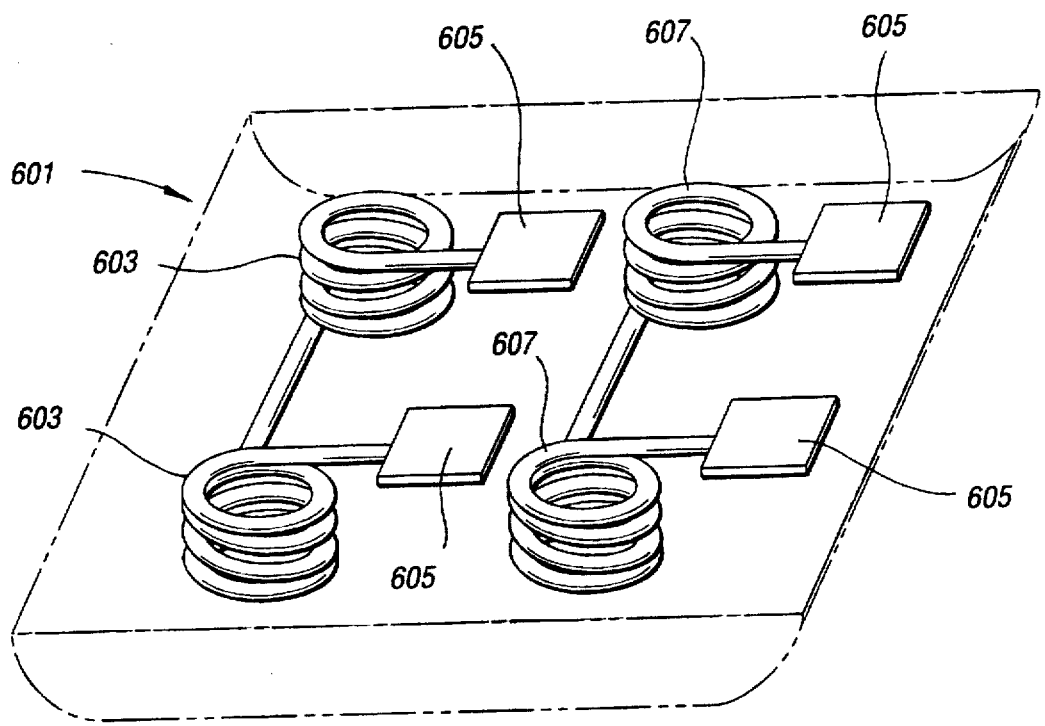
FIG. 6b illustrates a single platen containing multiple induction coils.
Figure 6C:
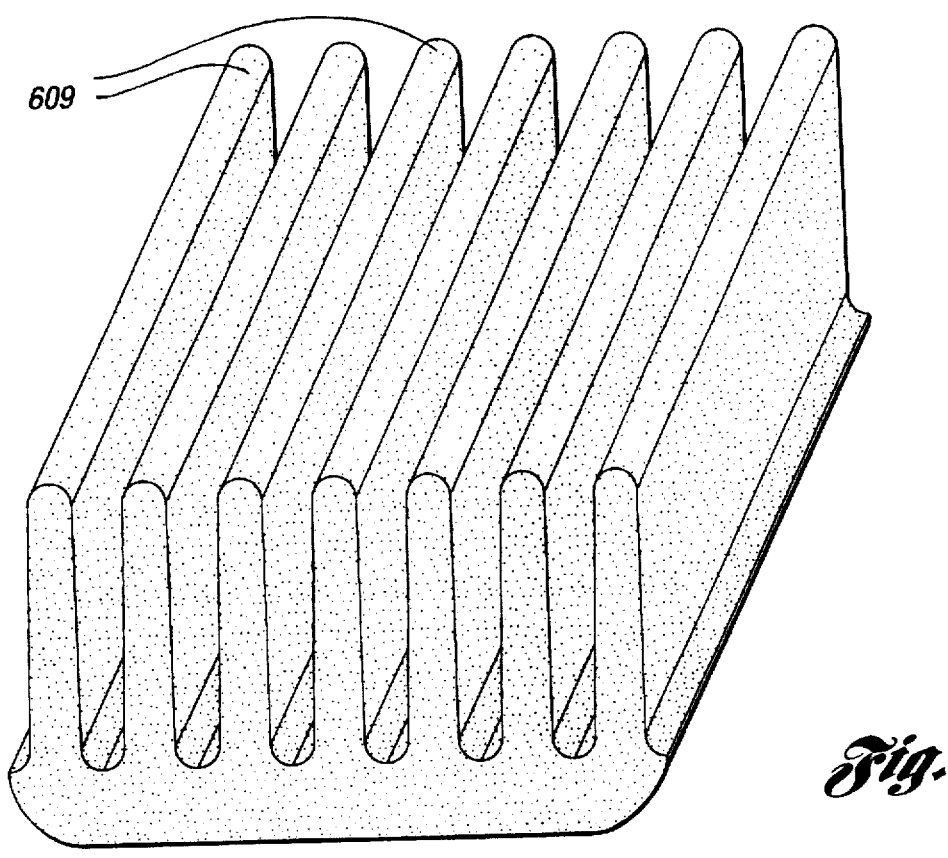
FIG. 6c illustrates a platen having a top mounted heat radiator which may be heated or cooled by a stream of hot or cold gas.
Figure 6D:
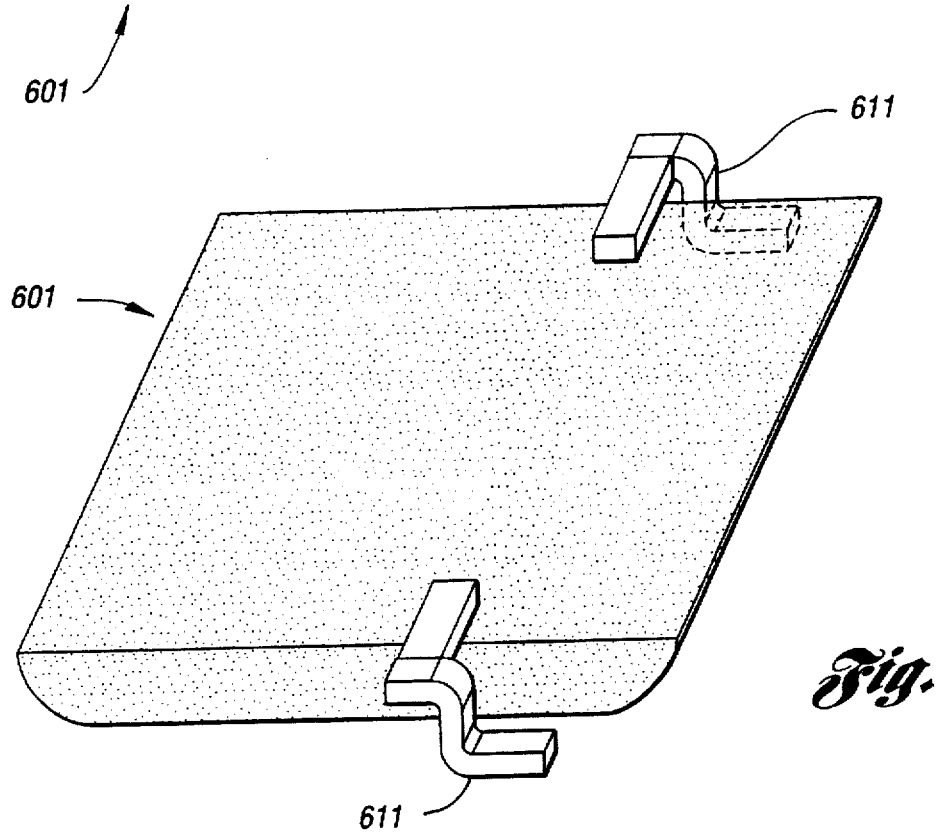

In a preferred embodiment, as illustrated in FIG. 5, the belt may have positioned within it, one or more, preferably two, three or more pressure platens which further contain temperature adjusting means. As the platens travel from right to left with the belt, teeth are successively proximate to the first, second, third, etc. platen. With respect to FIG. 5, for example, the toothed belt 501 rotates around wheels 503 and 505 as the belt carrying teeth 502 traverses the core 507 being formed. Lead wheel 503 may be heated or the wheels may be recessed, the outer portion supplying pressure, the recess sized to accommodate the lead platen 509. Located within the belt are platens 509, 511, 513, and 515. For belt progression to the left, for example, the lead platens, e.g. 509 and 511, may be heating platens containing electrical connections to energize resistive heating elements as shown in FIG. 4a, energized by corresponding electrical contacts 611 on the pressure platen as shown in FIG. 6d; one or more induction coils, as shown in FIGS. 6a and 6b, to energize an inductively heatable strip as illustrated in FIG. 4b or an inductively heatable coating as in FIG. 4c; or a hot shoe as may be used with the heating device illustrated in FIGS. 4e and 4f. Platens 509 and 511 may be maintained at the same temperature or different temperatures. Platens 513 and 515 may be cooling platens, maintained at the same temperature as each other or at different temperatures, the respective temperatures maintained by simple absorption and radiation of heat, or by being adapted to be contacted by or to receive a supply of cooling liquid, for example cool water, refrigerant, or air.

For example, a platen may be constructed in accordance with FIG. 6a, the platen 601 having a single induction coil 603, electrically energized at contacts 605. The platen serves to inductively heat all the teeth below the platen with some degree of uniformity. A second or successive platen may also contain an induction coil or other temperature adjusting means, and thusly the teeth proximate the second platen may be subjected to a higher or lower amount of thermal energy, maintaining the respective sets of teeth at different temperatures. Alternatively, a single platen may have a plurality of individually controlled induction coils 603 and 607 such as shown in FIG. 6b which allow individual teeth or sets of teeth below this platen to be maintained at different temperatures. A second, third or successive platen in either case, may contain passages through which refrigerant, cool liquid or air flows, or may instead have a cool air supply directed against it, as shown in FIG. 6c, to provide cooling rather than heating by directing a stream of fluid of the appropriate temperature towards heat radiating/absorbing fins 609. In this manner, particularly with thermoplastic materials or fiber reinforced thermoplastic materials, the node-antinode demes may be cooled while still under pressure, allowing for optimal consolidation. A platen having electrical contacts 611 suitable for energizing a tooth containing resistive electrical heating means is shown in FIG. 6d.

It is particularly advantageous to prepare the toothed belt from a high temperature resistant elastomer such as silicone rubber. The teeth of such elastomeric belts may have resistive heating elements molded into the teeth, with electrical contacts located on the inner belt surface as shown in FIG. 4a. Alternatively, the teeth may have inductively heatable materials embedded therein, or may be coated on the tooth periphery with an inductively heatable or dielectric heatable coating or paint. The former bars may advantageously be prepared from material which cannot be inductively or dielectrically heated or which offers low efficiency with respect thereto, with the uppermost (node-contacting) surface of the rods made or coated with an inductively or dielectrically heatable material. In this manner, the web may be heated from both sides to speed up the overall process, yet the heat will be restricted to the node-antinode deme and substantially absent from areas not desired to be heated, such as the diagonal cell walls.

While the invention has thus far been described in its simplest form, i.e., that of a continuous belt, it will be recognized that a truly symmetrical continuous belt is not required, but that instead equivalent devices which provide the advantages of the subject invention may be used. For example, rather than a continuous belt having teeth along its total periphery, and which revolves in one direction, a continuous belt containing teeth only along a portion of its periphery may be used. In such case, the belt will revolve in a given direction, and following completion of its travel may be lifted from the core, traversed to the starting position, and during traversal, rotated in the opposite direction to bring the toothed portion to a position for resuming corrugation/consolidation.

In a similar manner, the corrugation/consolidation unit may comprise a set of linked teeth supported at both ends, which may be visualized as a continuous belt which has been cut across its width at one point, as illustrated in FIG. 7a. In FIG. 7a, the teeth 701, which may be linked together as shown in FIG. 9b; are suspended from suspension means 703 and 705 which may be metal bands, chain link devices, metal cables, or the like. Platen 707 serves to press the teeth against the core, and contact of the leading tooth with the radiused leading edge 709 of the platen is facilitated by tensioning support means 703 as the platen is forced to move from right to left. What is important is that the same teeth be permitted to dwell upon the particular node-antinode deme for purposes of consolidation, while simultaneously another tooth is corrugating web to form a new node-antinode deme. This scheme is not possible with a toothed wheel or squirrel cage roller, as consolidation of the just formed node-antinode deme must be finished as the tooth, just having performed corrugation, is lifted from the node-antinode deme as the toothed wheel or caged roller rotates forward. Thus, in the present invention, two, ten, or even a hundred node-antinode demes may be in various stages of consolidation while new corrugations are being progressively formed, whereas in the prior art, for example the '596 patent, corrugation and consolidation of a single node is accomplished by an individual, rotating tooth, and no consolidation of a previously formed node-antinode deme takes place while new corrugations are formed. In the preferred embodiments of the present invention, the same tooth which performs corrugation continues to dwell upon the just-formed node-antinode deme, performing consolidation, while, at the same time, new node-antinode demes are being formed. The belt may further comprise a set of hexagonal, square, rectangular, or other cross-section bars linked together at the ends, and blackened to enable the bars to absorb light or other radiant energy.

A preferred embodiment of the subject invention employs teeth of a radiant energy transmissive material such as quartz, glass, or glass-ceramic material. By "quartz" is meant quartz per se or glasses comprising quartz (silicon dioxide) in highly substantial part, such as Vycor® glass. The teeth are exposed to radiant energy from the direction furthest away from the web-contacting toothed surface, in the case where the teeth are mounted on a traveling belt, from inside the belt infrared radiant energy is preferred, and may be supplied by conventional infrared heat sources, such as tubular ceramic infrared heaters, or preferably, a water cooled quartz infrared tube source such as Model 5305 available from Research, Inc., Minneapolis, Minn., which can provide heat flux up to c.a. 378 watts/linear inch.

The radiant energy flows through the transmissive tooth without substantially heating it, and impinges upon the exposed node-antinode web surface, rapidly heating the node-antinode deme provided the web is capable of absorbing a considerable quantity of the radiant energy. For materials such as aluminum, which can be highly reflective, or for less than ideal absorbing web materials such as Nomex® web which is less than 50% absorptive, it is desirable to coat the bottom of the transmissive tooth with a radiant energy absorptive material. This embodiment is preferred even when absorptive webs are used.

The radiant energy absorptive coating material is one which is preferably a highly efficient absorber, and more preferably, also is constructed of a substance which can serve as a release coating as well. The coating material should be able to withstand the temperatures associated with the process, and should be chemically resistant to the materials expected to be contacted, i.e. molten thermoplastic, adhesive, and/or thermosetting resin materials as well as their A-staged, B-staged and other advancement products. Preferably, the coating is a black teflon coating, which may be applied to the tooth surface by standard powder coating techniques.

Alternatively, the coating may be a temperature resistant thermosetting resin loaded with an absorber such as carbon black or other infrared absorbing pigment, or a high temperature thermoplastic such as a polyamide, polyetherimide, polysulfone, polyethergulfone, polyether ketone, or the like, preferably also loaded with an energy absorbing dye or pigment. In such cases, a separate release coating such as a PTFE, polyvinylidene fluoride, or silicone resin or the like may be coated on the exposed surface of the tooth. Silicone coatings containing energy absorbing dyes and/or pigments may also provide the dual function of energy absorption and release as is the case with pigmented teflon.

Because the transmissive tooth itself is not heated, once the source of radiant energy is removed, the tooth can function as a heat sink, absorbing heat from the node-antinode deme upon which the tooth dwells. The heat absorbing function may be facilitated by blowing a stream of cool gas at the upper, non-contacting, exposed tooth surface. To concentrate heat as much as possible at the bottom tooth surface, the non-contacting, upper tooth surface may comprise a cylindrical lens, partially focusing or concentrating radiant energy towards the bottom tooth surface.

The beneficial results obtained by radiant heating of the web through transmissive teeth, or by means of the bottom, energy absorbing coating of a transmissive tooth, is augmented by the mounting of teeth in a traveling belt, as hereinbefore described. However, this embodiment possesses advantages even when a single, toothed corrugating roller is used, as the heating of thermoplastic web under pressure of the corrugating/consolidating roller controls shrinkage of the web which otherwise might occur when using a non-contacting heat source to heat the web, as disclosed in U.S. Pat. No. 5,139,596. By the term "transmissive corrugating/consolidating roller" as used herein is meant a toothed wheel, squirrel cage roller or equivalent device adapted to transmit radiant energy through or to the bottom surface of corrugating or corrugating/consolidating teeth. Such devices may take a number of embodiments, including but not limited to wheels having mounted thereto, or embedded therein, teeth of a transmissive material; a toothed roller constructed entirely of transmissive material, prepared, i.e. by machining a quartz or glass-ceramic cylinder; or a squirrel cage roller having transmissive elongate teeth mounted therein concentric with an axis of rotation. The transmissive corrugating/consolidating roller preferably has a radiant energy source located within the roller.

The non-transmissive areas between teeth, whether on a traveling belt, roller, or the like, are preferably shielded by a reflective coating such that radiant energy is transmitted only through the transmissive teeth. Such coatings may be aluminized coatings, silvered coatings, metal foil, metal shields, and the like. In the case of a traveling belt, a symmetrical or non-symmetrical cylindrical reflector may be located on the side of the radiant energy source remote from the belt. The reflector may be designed to focus radiant energy on a single tooth, relatively uniformly on a defined set of teeth, or non-uniformly, with certain teeth receiving more radiant energy than others. Multiple radiant energy sources which may be the same or different may be used.

The term "radiant energy transmissive" is further meant to include RF transmissive, as used with RF heating. In RF heating, radio frequency electromagnetic energy is applied to two conductors (transmissive substances) in close proximity, with a dielectric between them. The dielectric substance absorbs RF energy, and the energy absorbed is converted to thermal energy, rapidly heating the dielectric. The amount of RF energy absorbed is related to the dielectric loss, or dissipation factor of the dielectric material. Certain thermoplastics have a sufficient dielectric dissipation factor to themselves act as the dielectric, and web materials containing such thermoplastics can be effectively consolidated by dielectric heating. In such cases, one or more metal former bars may act as one electrode, while the teeth of the corrugating/consolidating unit serve as the other electrode, with a radio frequency generator connecting the two. For thermoplastics and thermosetting resins which do not have the requisite dielectric dissipation factor, for example polyolefins and certain cyanate ester resins, the proximate surfaces of the former bars (i.e. topmost surface of both sets of bars) and/or the lower teeth faces may be coated with a high loss dielectric material, such as a ceramic. This ceramic coating may then be coated superficially with a release coating. FIG. 7b illustrates such an arrangement, former bar 701 being made of metal and coated on its topmost surface with a dielectric material 703 such as a ceramic, and superficial to the dielectric, a release coating 705. Likewise, the bottom, web contacting surface of tooth 707 has been coated with a dielectric coating 709, superficial to which is release coating 711. The webs 713 being consolidated are located between the proximate surfaces of the bar and tooth. Further reference may be had to U.S. Pat. No. 5,427,645, which is herein incorporated by reference.

Figure 9A:
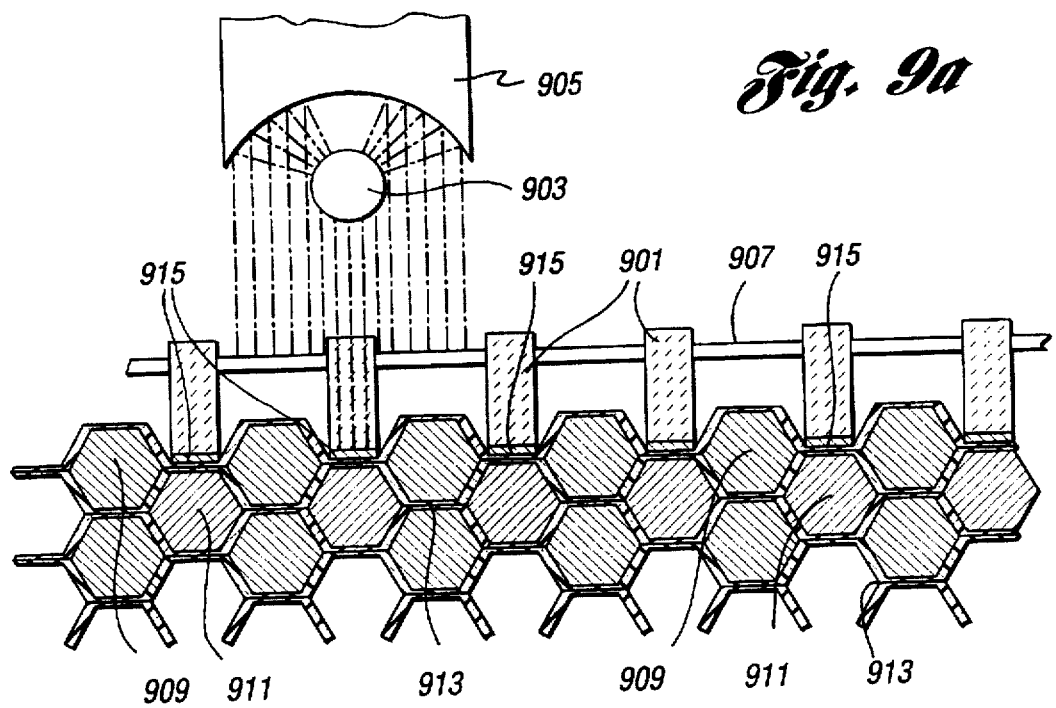
FIG. 9a illustrates one embodiment of the subject invention wherein radiant energy transmissive teeth and a source of radiant energy associated therewith supply the thermal energy for corrugation and/or consolidation.
Figure 9B:
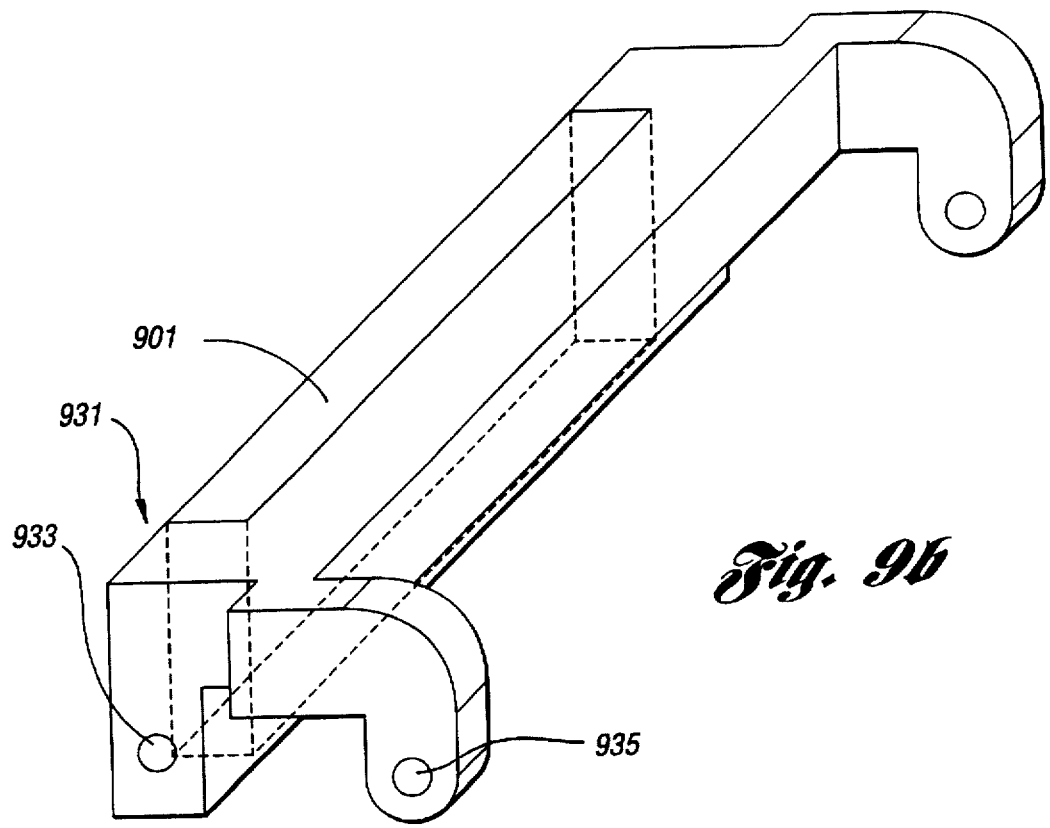
FIG. 9b illustrates one embodiment of a holder for a radiant energy transmissive tooth adapted to be linked together to form a traveling belt.

FIG. 9a illustrates a traveling belt unit containing an infrared radiant light source and transmissive teeth. The transmissive teeth are preferably of quartz, and are mounted in a tooth holder which is articulated with other tooth holders to form the belt. One design of tooth holder is shown in perspective in FIG. 9b. In FIG. 9a, the teeth 901 comprise a radiant energy transmissive substance such as quartz which may be irradiated singly or multiply by radiant energy source 903 in conjunction with reflector 905. Located between the transmissive teeth 901 are reflective shields 907. The upper former bars are shown at 909 and the lower bars at 911, with the consolidated node-antinode demes 913 of double thickness, and the double thickness node-antinode demes in the process of being consolidated at 915.

In FIG. 9b, the quartz tooth 901 is held in holder 931 by a holding means, which may be a simple set screw arrangement or by means of a suitable adhesive, for example an epoxy adhesive. Bores 933 and 935 serve to link the holders together to form the belt. Preferably, bore 933 is threaded to receive a threaded retaining screw. The top surface of tooth 901 is preferably polished to admit energy, may be domed to form a crude lens to concentrate the energy, and may have an antireflection coating to encourage maximum light transmission.

Figure 9C:
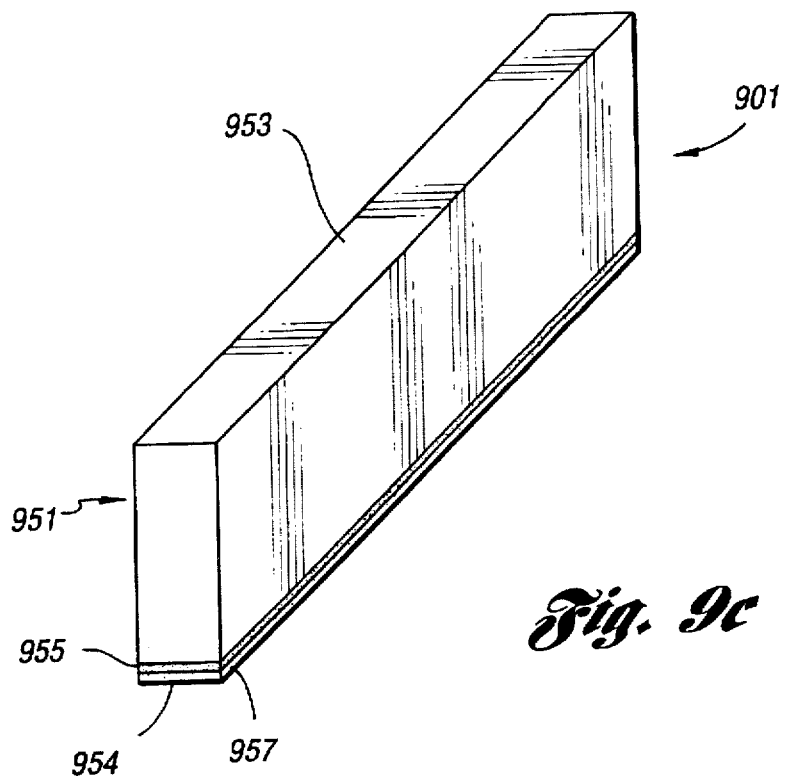
FIG. 9c illustrates a radiant energy transmissive tooth for use with the apparatus of 9A and 9B.
Figure 9B:
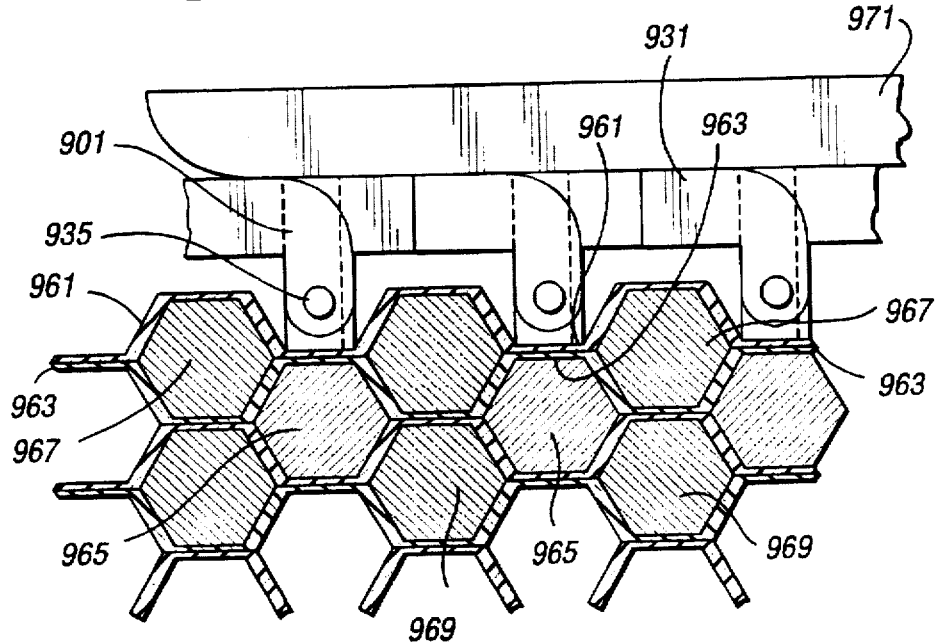

In FIG. 9c is illustrated a single tooth, in this case of rectangular cross-section, at 901. The body 951 of tooth 901 is made preferably of quartz, with the top surface 953 polished and optionally anti-reflection coated. The bottom, web-contacting surface 954 of the tooth is preferably coated with an optional radiant energy absorptive coating 955, superficial to which is optional release coating 957. More than one of each type of coating may be used, or a single, coating such as black PTFE may serve as both the absorptive and release coatings.

FIG. 9d illustrates more clearly the interaction of the tooth with the web node-antinode demes. Holder 931 containing quartz tooth 901 (in shadow) bear down on the node-antinode deme which consists of topmost web 961 and previously laid web 963. Located just below the node-antinode deme is a former bar 965 from the lowermost set of former bars. Topmost former bars 967 have served prior to consolidation, as the surfaces over which web 961 was corrugated by the leading tooth of the track or a corrugating roller. Also shown is a set of support bars 969 which are optionally added to provide support in the case of wide cores. Pressure rails are located above the articulated holder on each side of the belt. One pressure rail is shown at 971.

A further corrugating/consolidation unit comprises a toothed belt or portion thereof as previously described, containing elongate teeth, elongate anti-teeth, or combinations thereof, one or more pressure applying rollers, and minimally a pair of pressure rails, all adapted to press down upon the toothed belt from the side of the belt remote from the core. This embodiment of the apparatus is most suitable when corrugation and consolidation are completely independent steps, i.e. the corrugation step does not involve any degree of consolidation. However, the apparatus may also be used when the corrugation step involves at least a partial degree of consolidation as well. The apparatus is preferred when webs having a substantial degree of tensile strength in the direction of the web are used, particularly when the toothed belt is constructed to contain anti-teeth or combinations of anti-teeth and teeth which may be inserted into the space between adjacent anti-teeth.

In this embodiment of the corrugation/consolidation unit, a lead pressure roller acts to corrugate the supplied web into the antinodal cavities located between flanking uppermost former bars. Substantially coincident with the axis of the lead pressure roller, a pair of pressure rails, preferably of teflon or other material having a low coefficient of friction, or coated with a low coefficient of friction coating, are pressed against the surfaces of the uppermost former bar bank; either by pneumatic or hydraulic pressure, or preferably by spring pressured i.e. by a plurality of springs urging each pressure rail downward. The pressure rails, in addition to supplying the pressure needed during consolidation of the node-antinode demes also serve, in the case where no consolidation occurs during corrugation, to maintain the position of the web and ensure that the web material does not pull away due to the web supply tension, thus enabling thorough consolidation.

Located between the pressure rails may be heating and/or cooling platens as described previously. Preferably, a source of radiant energy with a focused beam is positioned such that the majority of radiant energy may travel through the spaces between adjacent anti-teeth, the focal point corresponding approximately with the plane of the topmost surface of the lowermost former bars. By the means described above, it has been surprisingly been discovered that even when anti-teeth; which do not contact the full node-antinode surface, are used, that the tension of the web which exists between the web-contacting surfaces of adjacent anti-teeth is sufficient to allow excellent consolidation. Most preferably, a further pressure roller follows the pressure rails, the web immediately proximate the further pressure roller being cooled by a jet of air.

The toothed belt or portion thereof previously described may also be configured to contain "anti-teeth." The "teeth" of the normally toothed belts are arranged such that the lower faces of the projecting, elongate teeth contact the webs to be consolidated over the width of the node-antinode deme or a substantial part thereof, as shown, for example, in FIG. 9d, where the node-antinode deme consisting of previously laid web 963 and topmost web 961 abut in the spaces between topmost former bars 967. It has been surprisingly discovered that for at least some web materials, the entire node-antinode deme or substantial fraction thereof need not be contacted by the teeth faces, but that consolidation and corrugation may be effected by anti-teeth which contact the node-antinode demes only at node portions adjacent the flanking diagonal walls of the honeycomb. Such an arrangement is shown in FIG. 12b.

Figure 12A:
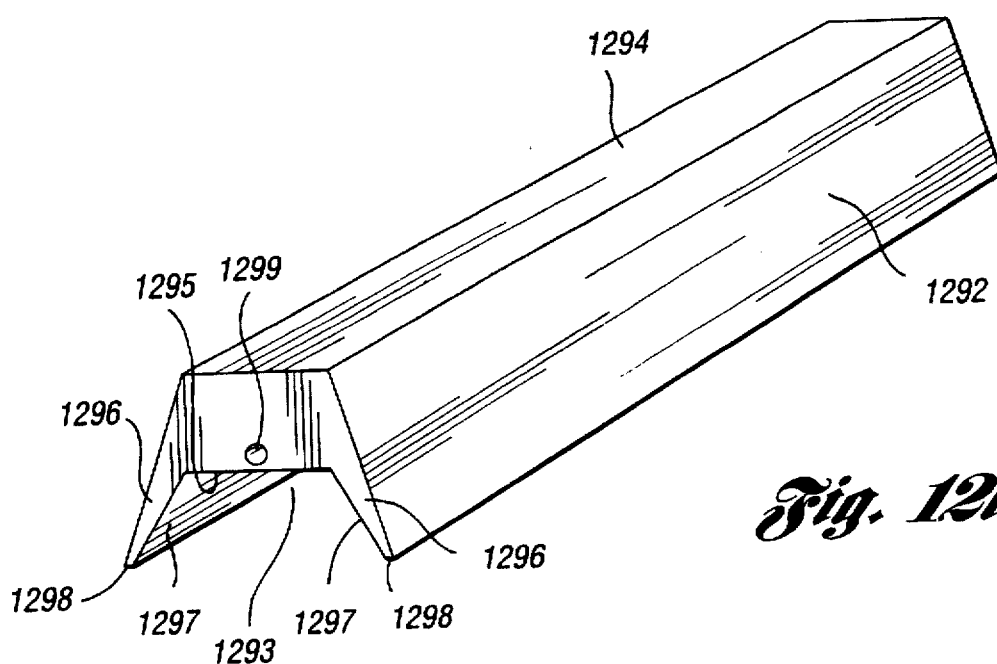
FIG. 12a illustrates a linkable anti-tooth corrugation/consolidation element.
Figure 12B:
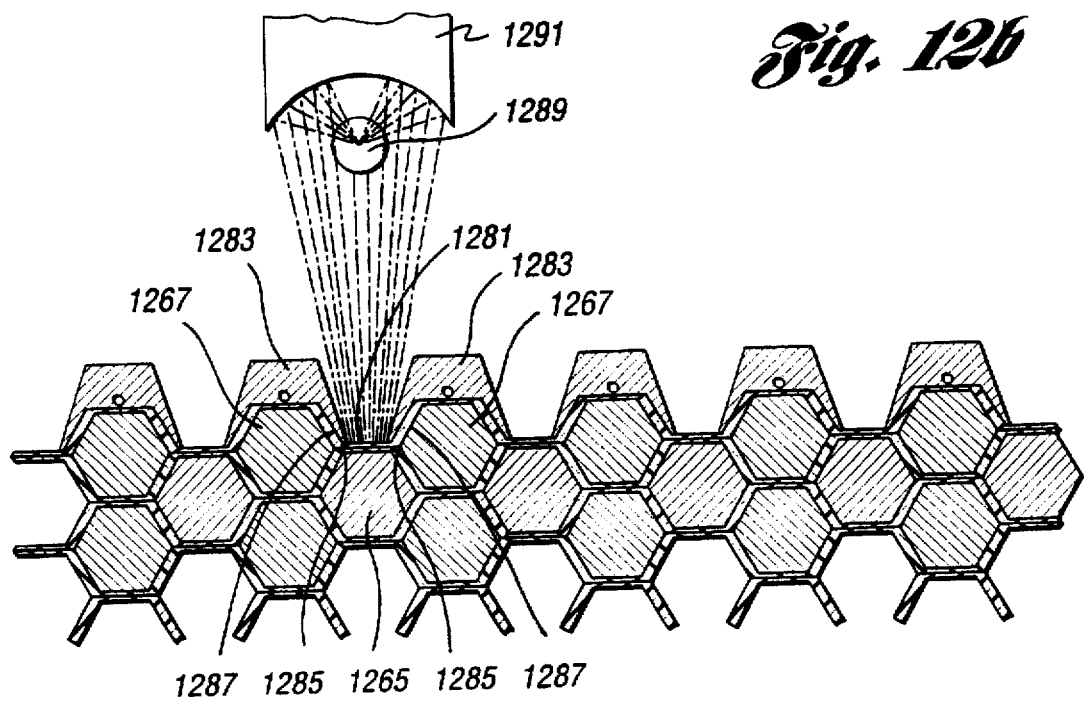
FIG. 12b illustrates use of radiant energy together with anti-teeth for corrugation/consolidation.

In FIG. 12b, the node-antinode deme 1281 to be consolidated is located between topmost former bars 1267 and over lowermost former bar 1265. Anti-teeth 1283 are configured to press against the webs in the node-antinode demes at the portions 1285 adjacent to the diagonal flanking walls 1287. A heat source, preferably a non-contacting heat source, and most preferably a focused beam of infrared and/or visible light supplied by infrared light source 1289 and focused by reflector 1291 impinges upon the node-antinode deme surface 1281 which is exposed between adjacent anti-tooth/web contacting portions 1285.

The anti-teeth are thus configured to fit over the topmost formers rather than between them, preferably with a clearance such that no contact is made between the anti-teeth and the web lying atop the topmost surface of the uppermost former bars, and minimal contact with the web located along the flanking walls of the uppermost former bars. An enlarged view of an anti-tooth is shown in FIG. 12a. The recess 1293 is adapted to fit over the former bars without substantial contact with the former bars along surfaces 1295 and 1297. At 1299 is a hole positioned to receive a pin which enables adjacent anti-teeth to be linked together. Projecting arms 1296 terminate in anti-teeth web-contacting surfaces 1298. The position of the hole 1299 to receive a linking pin is located as close to the plane of the upper surfaces of the topmost former bars as possible. In lieu of pins, the anti-teeth may be linked together by other means as well, for example, by inserting the ends in suitable tracks or by inserting into woven metal braid. The anti-teeth are preferably made of metal and polished on their upper, non-contacting surfaces 1292 and 1294 to reflect unwanted radiant energy.

Figure 11:
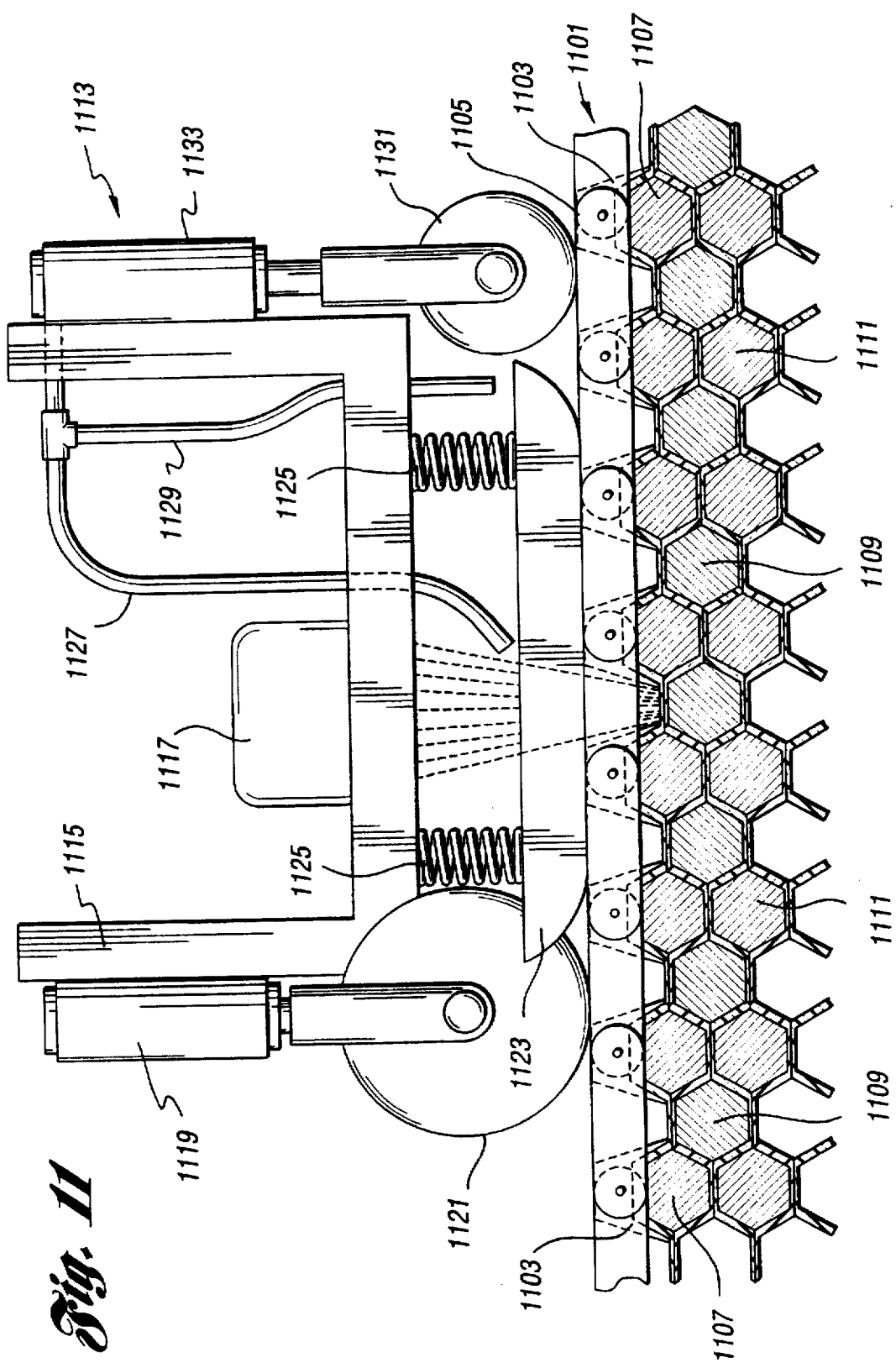
FIG. 11 illustrates one embodiment of a corrugation/consolidation unit employing anti-teeth.

In FIG. 11 is illustrated a pressuring device suitable for use with both anti-teeth as well as toothed configurations of the subject invention. In FIG. 11, a belt 1101 comprises anti-teeth 1103 linked together by links 1105. The uppermost former bars, lowermost former bars, and support bars are shown at 1107, 1109 and 1111, respectively. The pressuring unit 1113 has a rigid frame 1115 within which is located focused radiant energy source 1117. Hydraulic or pneumatic cylinder 1119 forces roller 1121 against the top surfaces of anti-teeth 1103, to corrugate the web. Pressure rails 1123 straddle the pressure roller 1121 which may be sized along its cylindrical axis to fit between the pressure rails. The pressure rails 1123, preferably of PTFE, maintain the corrugation achieved by roller 1121 and keep pressure on the node-antinode demes during consolidation. The pressure rails are urged toward the top surface of the anti-teeth by springs 1125. Tube 1127 supplies cool air against the pressure rails 1123 to prevent them from overheating. A further tube 1129 delivers cool air to the web in the proximity of trailing consolidation roller 1131, urged against the anti-teeth by hydraulic or pneumatic cylinder 1133. Following the laying down of a web, the pressuring unit 1113, together with belt 1101 may be raised and traversed back to its starting position, or may be moved sideways and traversed. The actual mode of movement is not important.

The process of the subject invention may be employed with numerous web materials to form honeycomb materials. By "web" is meant any of these materials, non-limiting examples being webs of paper, non-woven fiber, woven textile, ceramic or metal fiber, etc., impregnated with thermoplastic, thermosetting resin, combinations of thermoplastic and thermosetting resins, optimally coated with adhesive, metal foils, and the like. Preferred webs include woven, non-woven and film thermoplastics such as polyvinylchloride, polystyrene, polyethylene, polyethersulfone, polysulfone, polyphenylene sulfide, polyetherketone, polyimide, polyetherimide, and the like, optionally reinforced with ceramic, glass, quartz, carbon, graphite, boron nitride, or other fibers, both continuous and discontinuous, woven and non-woven. Preferred thermosetting resins include epoxy, bismaleimide, cyanate, combinations thereof, phenolic resins, and furan resins and the like. Among the metal foils used may be mentioned aluminum and aluminum alloys, steel, stainless steel, copper, brass, magnesium, beryllium, tungsten, and the like.

The advantages of the subject invention are numerous. Due to the ability to independently adjust corrugating and consolidating temperatures in the preferred embodiments, an unprecedented level of flexibility is achieved. Consolidation of node-antinode demes is complete and uniform, providing a high strength core having uniform properties. A major advantage, however, is processing speed. While some materials may be rapidly processed by the apparatus described in U.S. Pat. No. 5,139,596, others cannot be, or must be processed at very slow traverse rates resulting in low volume production of core per hour. This is particularly true with thermoplastic webs requiring extended consolidation time and thermoset polymer-impregnated fibrous webs requiring an extended cure time. Some idea of the improvement which the present invention enables may be gleaned from the following.

The process of U.S. Pat. No. 5,296,280, for example, when used to make a core of 0.25 inch (0.64 cm) cell size and dimensions of 24 inches (61.0 cm) in length by 6 inches (15.2 cm) thickness by 12 inches (30.5 cm) wide, require that 53 nodes be bonded for each layer. Assuming a 10 second adhesive bond time at 300° F. (149° C.), and a precorrugation and stacking time of only 30 seconds, with a 20 second recycle, each layer will require about 60 seconds. With the required 8 layers per inch, a total of 15,360 seconds, or 4.27 hours is required, corresponding to 2.13 hours/ft$^3$ (75.2 h/m$^3$) of core.

The method of U.S. Pat. No. 5,139,596, if modified so as to contain individually heated teeth, and requiring the same 10 second bond time as in the previous case, and a 5 second recycle time, would produce a 2 foot by 2 foot by 1 foot (61.0 cm×61.0 cm×30.5 cm) of 0.25 inch (0.64 cm) cell size, having 10,176 node-antinode bonds, in 10.6 hours/ft$^3$ (374 h/m$^3$). Thus, while the process of 5,139,596 is faster than other processes where consolidation time is rapid, it is slower when consolidation times are long due to the necessity to consolidate but one node-antinode deme at a time.

By contrast, using the belt design of the present invention with resistance heated or inductively heated teeth, a 12" (30.5 cm) belt containing c.a. 26 teeth, traveling at a linear belt speed of 0.10 s/ft (0.04 s/cm), and with a 5 second former bar recycle time, will produce a 2 ft by 0.5 ft by 1 ft (61.0 cm×15.2 cm×30.5 cm) core at the rate of 0.28 h/ft$^3$ (9.9 h/m$^3$). If the thickness of the core is doubled to 1.0 ft (30.5 cm) from 0.5 ft (15.2 cm), the production rate doubles to 0.14 h/ft$^3$ (4.9 h/m$^3$) of core. These rates are achieved using a magnetic particle-loaded epoxy node adhesive which itself can be inductively heated.

However, the most rapid production rate is attained with a traveling belt having transmissive teeth coated on their bottom (node-antinode consolidating surface) with a black teflon coating. Exposing a set of 5 teeth to a source of infrared radiation (tubular quartz lamp), and the processing parameters described in the preceding paragraph, core can be produced at the rate of 0.056 h/ft$^3$ (2.0 h/m$^3$) at 6 inch (15.2 cm) thickness, the latter corresponding to one cubic foot of core each 1.68 minutes The term "non-expanded" as used herein generally contemplates a core which contains fully formed cells wherein the node and antinode surfaces of the cells are spaced apart. However, it would not depart from the spirit of the invention to prepare a partially expanded core which is then further expanded, however, no advantage will be achieved thereby. Such core where the node-antinode demes of one layer are not substantially proximate to the non-node-antinode demes of the previous layer is still a non-expanded core as that term is used herein.

Figure 8:
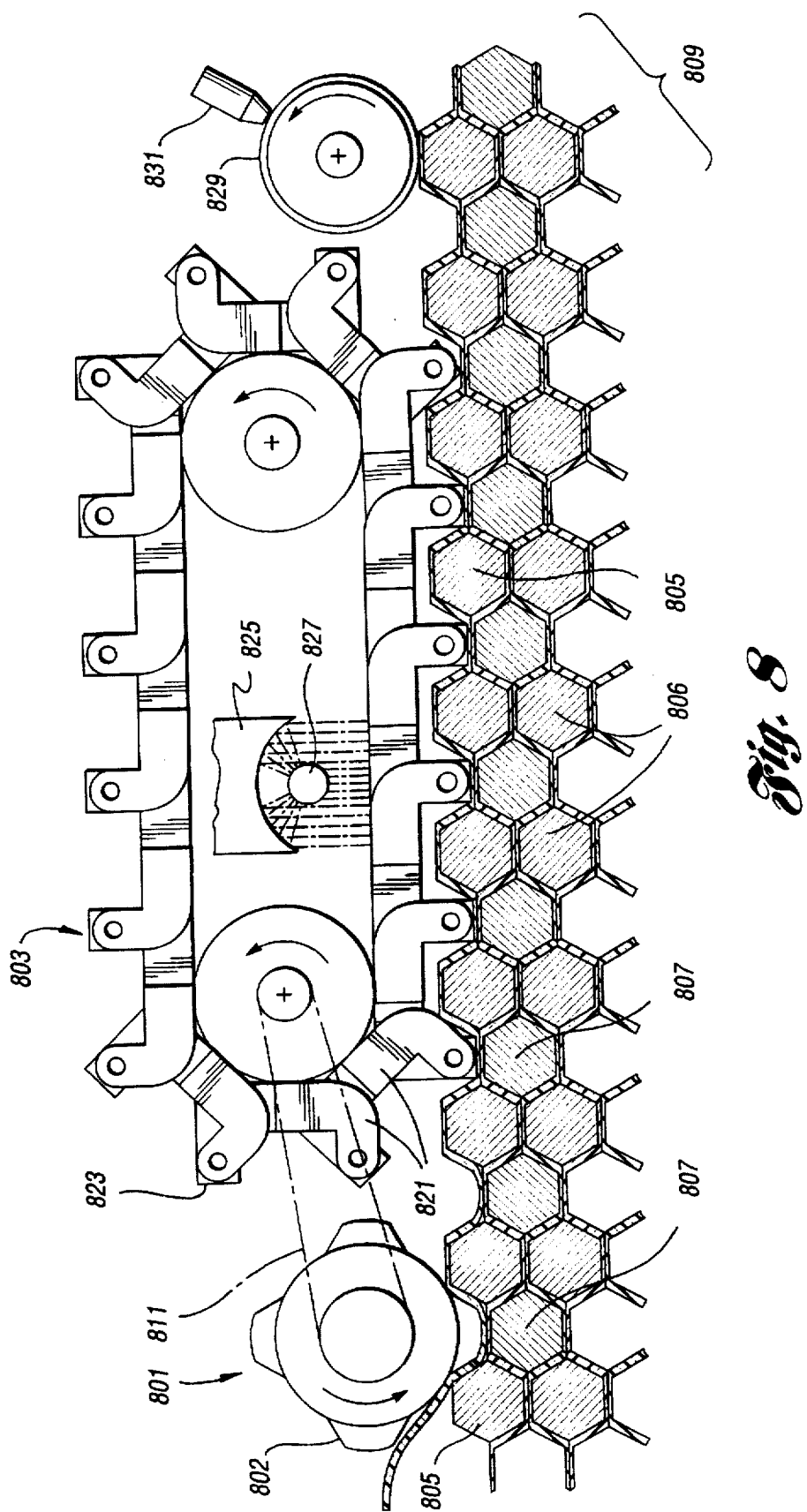
FIG. 8 illustrates an alternative embodiment employing a toothed wheel for corrugation and toothed track for consolidation, further illustrating a trailing roller for applying adhesive to honeycomb antinodes.

In a further embodiment, a separate corrugating roller precedes the continuous toothed track or its equivalent. Since the corrugating roller may be made quite small in such a case, it may be located quite close to the leading edge of the following track. The corrugating roller may have teeth of different shape than those of the track, which now performs the consolidation function only, rather than both corrugation and consolidation. Such an embodiment is shown in FIG. 8. In FIG. 8, small diameter corrugating roller 801 having corrugating teeth 802 precedes toothed belt 803 in close proximity over topmost former bars 805, lowermost former bars 807 and core 809. Support bars are shown at 806. Consolidation is accomplished in the embodiment illustrated by radiant energy transmissive teeth 823 mounted in linked holders 821 and illuminated by infrared source 827 and reflector 825. The remaining features are the same as described previously. The dotted lines at 811 indicate that the roller and belt are linked together such that they continue their travel in close proximity to each other while corrugation and consolidation are taking place. They may be mechanically linked, or may be separately driven, their positions guided by servo motors or the like. Whether the linkage is electrical or mechanical, they should travel in close proximity otherwise displacement errors in node to antinode abutment may occur.

In further embodiments of the subject invention, the traveling belt or equivalent progressive consolidation means may be followed by an adhesive applicator. A simple roller coated with adhesive, for example, may be used to coat only the top antinode surfaces with a suitable adhesive, or a flat press may be used to apply adhesive to an entire section of exposed antinodes. A roller adhesive applicator is shown at 829, the roller supplied with adhesive through adhesive supply 831. Likewise, transverse rollers or extruders may apply adhesive. Although adhesive is not necessary in many applications, it may be advantageous in others, for example with metal foil web. Additionally, provided suitable indexing apparatus is available, strips of adhesive may be applied to web prior to being corrugated.

The apparatus and method of the subject invention has been found to be eminently suitable for manufacture of an entirely new honeycomb core product. Dipped core products have been manufactured for use in a number of applications. Such cores, in the past, have generally been manufactured by an expandable core process followed by expanding the core, dipping the expanded core into a resin bath, and curing the resin. The expanded cores are produced by applying strips of an adhesive onto a web, which may be woven or non-woven, the strips of adhesive corresponding to the node-antinode demes upon expansion. The adhesive strips are thus applied parallel to the length of the corrugations, with the strips staggered one-half cell width away in alternate layers. The core is then expanded and dipped into the resin, which may, for example, be a phenolic resin, epoxy resin dispersion, or the like, and cured at elevated temperature in the expanded form. The process just described suffers from the disadvantages associated with expanded cores previously described. Minimal bonding at the nodal surfaces prevents this method from being used in many cases, as the core will be damaged upon expansion.

The process of the subject invention may be used to make non-expanded core as previously described, but with a plurality of adhesive strips running perpendicular to the corrugations, i.e., along the length of the web. The adhesive may be applied to the web prior to corrugation, may be applied as separate strips or films of adhesives, being corrugated with the web, and holding the core together only along a plurality of planes parallel to the exposed cell surface of the core, or may be applied in strips along the antinode surfaces by means of one or a plurality of roller adhesive applicators, the strips of adhesive resin running perpendicular to the axis of corrugation. The core thus formed is dimensionally stable, and may now be dipped in a resin bath and cured. By virtue of the presence of the adhesive strips, the core thus produced is indeed different from expanded cores produced by conventional methods.

Materials of which the novell, non-expanded, dipped core may be made include paper, non-fibrous materials such as metal foils and thermoplastic films or sheets, and woven and non-woven materials such as polyester, nylon, Nomex®, polyolefin, e.g. SPECTRA® polyolefin fibers, fiberglass, carbon fibers, ceramic fibers, and the like. An advantage of the core produced by the method just described is the ability to subject the core to modest bends or dimensional changes prior to resin dip, thus enabling production of honeycomb structures which are modestly curved or otherwise contoured.

The adhesive utilized in the preparation of such cores may be a thermoplastic or thermosetting adhesive. Non-limiting examples of suitable thermoplastic adhesives, or "hot-melt" adhesives, include polyurethanes, low melting polyolefins, ethylene vinyl acetate, and the like. Non-limiting examples of thermosetting adhesives include phenolic resins, furan resins, epoxy resins, bismalemide resins, cyanate resins, and the like. Due to their processing speed, thermoplastic adhesives are preferred.

In a preferred embodiment, two webs are supplied simultaneously to the honeycomb forming process, a lower web comprising a plurality of strips of adhesive in roll form, preferably one strip positioned proximate to one edge of the core, the other strip positioned proximate the opposite edge. Superficial to the adhesive web(s) or strips is a web, for example of Nomex®. The adhesive web(s) are Nomex® web are laid down, i.e., corrugated and fused by the process herein described, resulting in a core whose integrity is assured by the presence of the adhesive strips. The assembled core is then dipped and cured by conventional methods, during the course of which the remaining portions of the node-antinode demes which the adhesive strips have not covered, are consolidated.

Having generally described this invention, a further understanding can be obtained by reference to certain specific examples which are provided herein for purposes of illustration only and are non intended to be limiting unless otherwise specified.

Nomex Paper Honeycomb, Dipped in Phenolic Resin

A web of 100% Nomex® 3 mil paper is formed, heat set, and bonded in a honeycomb shape with ¼" strips of nylon film adhesive (Bemis 4220) used at the extreme edges of the block to hold the block together, in an apparatus as shown in FIGS. 10, 11, 12a, and 12b. The already expanded block is then placed in an external frame to maintain cell shape, the block dipped in phenolic resin (Borden Durite SC 409B), dried and partially cured at 200° F. for one hour, re-dipped, re-cured (partially) and the process repeated until a final desired density is reached, after which full cure is effected at 350° F. for 2 hours. The area of Nylon adhesive node bond is trimmed off and the resulting core is completed without the need or use of any separate node bond adhesive as the phenolic resin performs both the function of densifying resin and node bond adhesive. Capillary action causes the resin to migrate into the contacting node area of the web, filling the node-antinode deme contacting area and creating a fillet in the node area at the same time. This product cannot be made via an expansion method as the node bond strength is not sufficient, due to so little node area bonded prior to dipping, to expand the block.

Nomex Paper Honeycomb, Impregnated With Nylon Resin

A web of 100% Nomex® 3 mil paper is formed and heat set and bonded in a honeycomb shape with full width strips of nylon film adhesive (Bemis 4220) simultaneously bonded to the Nomex paper in the honeycomb building process. The nylon adhesive acts as the node bond adhesive and also as the densifying resin for the Nomex paper. Such a combination yields a structure that is thermoplastic in nature, tough, easy to bond skin materials to, and relatively low cost to produce when compared to traditional phenolic dipped Nomex honeycomb. The nylon may on one side or both depending on the functional need of the core material.

Aluminum Honeycomb Dipped in Epoxy or Polyester Resin

A web of aluminum foil material (1.5 mil) is bonded as described previously as in the first Nomex® paper example, dipped in a catalyzed polyester or epoxy resin and heat cured at 150° F. for one hour. The film adhesive area is trimmed as above and the final product is a core formed without the need or use of any separate node bond adhesive as the polyester or epoxy resin performs both the function of a coating resin and node bond adhesive. Capillary action causes the resin to migrate into the contacting node-antinode demes of the foil, filling the abutting contacting surfaces and creating a fillet in the node area at the same time. This product cannot be made via an expansion method as the node bond strength is insufficient to expand the block.

Aluminum Honeycomb Coated With Thermoplastic Film

A web of aluminum foil material (1.5 mil) is coated (one or both sides) with a nylon (Bemis 4220) or urethane (Bemis 3205) film and formed and bonded in a honeycomb shape. The nylon or urethane adhesive acts as the node bond adhesive and also as a protective coating and toughening means for the aluminum foil. Such a combination yields a structure that is thermoplastic in nature, tough, easy to bond skin materials to and relatively low cost to produce when compared to traditional aluminum honeycomb. The coating may on one side or both depending on the functional need of the core material.

Nomex Honeycomb Prepared With A Pre-Impregnated Nomex/Phenolic Web

A web of 100% Nomex® 3 mill paper is pre-impregnated with a phenolic resin (Borden Durite SC 409B), which has been dried (but not cured) at 200° F. for 15 minutes, and is subsequently formed and heat set and bonded in a honeycomb shape. The thermoset adhesive in the node demes is cured during consolidation, allowing the honeycomb to remain stable throughout a subsequent dipping process. The already expanded block is then placed in an external frame to maintain cell shape, the block dipped in further phenolic resin (Borden Durite SC 409B), dried and partially cured at 200° F. for one hour, re-dipped, re-cured, dipped again, etc., until a final desired density is reached, and then brought to full cure at 350° F. for 2 hours. The resulting core is completed without the need for use of any separate node bond adhesive as the phenolic resin performs both the function of densifying resin and node bond adhesive. This product cannot be made via an expansion method as the entire block would be cured in the un-expanded state upon curing the node bonds. This process has the advantage of requiring fewer dipping steps in order to reach final density since a large amount of the phenolic resin is applied during the web impregnation step. This process is easily adapted to other thermoset and thermoplastic resin systems as well.

Having now fully described the invention, it will be apparent to one of ordinary skill in the art that many changes and modifications can be made thereto without departing from the spirit or scope of the invention as set forth herein.

What is claimed is:

1. A continuous process for the preparation of non-expanded honeycomb core, each half-cell height of honeycomb core prepared by a process comprising:

a) disposing a first set of former bars into the uppermost complete cells of a honeycomb core;

b) disposing a second set of former bars in antinode depressions in the topmost surface of said honeycomb core, leaving top nodal surfaces of topmost cells of said core exposed between the former bars of said second set of former bars;

c) sequentially corrugating a non-corrugated web over said second set of former bars to form corrugations such that the bottom antinodal surfaces of said corrugations abut said top nodal surfaces of said cells of said core to form a node-antinode deme;

d) progressively applying heat and pressure to a plurality of said node-antinode demes, said heat and pressure sufficient to consolidate said node-antinode demes to form consolidated node-antinode demes and a new topmost row of cells.

2. The process of claim 1 further comprising:

e) progressively cooling said at least partially consolidated node-antinode demes under pressure to fully consolidate said node-antinode demes.

3. The process of claim 2 wherein said consolidated node-antinode demes are cooled under pressure to a temperature below the melt temperature of thermoplastic polymer, an at least partially cured thermosetting polymer, or mixture thereof contained in said web.

4. The process of claim 1 wherein said web comprises a woven or non-woven fibrous web containing a thermoplastic component.

5. The process of claim 1 wherein said web is selected from the group consisting of metal webs, fiberglass webs, carbon fiber webs, thermosetting resin-impregnated fibrous webs, thermoplastic impregnated fibrous webs, woven thermoplastic webs, non-woven thermoplastic webs, thermoplastic film webs, metal webs, and combinations thereof.

6. The process of claim 1 wherein said web comprises an adhesively coated web.

7. The process of claim 1 wherein following said corrugating, said consolidation, or said corrugating and said consolidation of said web, the exposed top nodal surfaces of said web is coated with an adhesive.

8. The process of claim 1 wherein said step of corrugating (c) and said step of consolidating (d) are performed by a plurality of teeth mounted on a traveling belt.

9. The process of claim 8 wherein the temperature of said teeth of said belt are individually adjustable, or adjustable insets of two or more contiguous teeth, at least a first portion of said teeth having a temperature different than at least a second portion of said teeth at any given time during corrugation, consolidation, or during corrugation and consolidation.

10. The process of claim 8 wherein each of said teeth contains a resistive heating element.

11. The process of claim 8 wherein each of said teeth contains an inductively heatable element.

12. The process of claim 11 wherein said inductively heatable element is inductively heated by means of an induction coil located on the side of said traveling belt remote from said core.

13. The process of claim 12 wherein said induction coil is located in a pressure platen which further serves to urge a portion of said teeth located between said platen and said core against said node-antinode demes positioned below said portion of said teeth.

14. The process of claim 1 wherein said corrugating (c) is performed by a corrugating roller, said corrugating roller traversing said core in a direction perpendicular to the axis of the corrugations of said core, said corrugating roller followed in close proximity by a traveling belt containing a plurality of consolidating teeth.

15. The process of claim 1 wherein the temperature of said non-corrugated web is increased prior to corrugation.

16. The process of claim 15 wherein the temperature of said non-corrugated web is increased by exposing said web to radiant energy, microwave energy, or a stream of hot gas.

17. The process of claim 1 wherein said teeth are radiant energy transmissive teeth, at least a portion of said teeth exposed to a radiant energy source located above the topmost portion of said teeth.

18. The process of claim 17 wherein said transmissive teeth further comprise an energy absorbing coating on the bottommost, web-contacting portion of said transmissive teeth.

19. The process of claim 18 wherein said transmissive teeth further comprise a release coating located superficial to said energy absorbing coating.

20. The process of claim 18 wherein said energy absorbing coating comprises polytetrafluoroethylene.

21. The process of claim 17 wherein said transmissive teeth are carried in a metal holder adapted to be linked to form a traveling belt.

22. The process of claim 1 wherein nodal surfaces of said new topmost row of cells are coated with an adhesive prior to forming a subsequent row of cells.

23. The process of claim 1 wherein said step of corrugation, said step of consolidating, or said steps of corrugating and consolidating are performed by a plurality of anti-teeth mounted on a traveling belt.

24. A continuous process for the preparation of non-expanded honeycomb core, said process comprising:
   a) disposing a first set of former bars into the uppermost complete cells of a honeycomb core;
   b) disposing a second set of former bars in the antinode depressions in the topmost surface of said honeycomb core, leaving the top nodal surfaces of the cells of said core exposed between said second set of former bars;
   c) sequentially corrugating and consolidating a non-corrugated web over said second set of former bars to form corrugations such that the bottom antinodal surfaces of said corrugations abut said top nodal surfaces of said cells of said core to form a node-antinode deme;

wherein said step of sequentially corrugating and consolidating is effected by a transmissive corrugating/consolidating roller having elongate teeth transmissive to radiant energy associated with a source of radiant energy which directs said radiant energy through said teeth toward the bottom, node-antinode contacting face of said teeth.

25. The process of claim 24 wherein said transmissive teeth are coated on the bottom, node-antinode contacting face, with a radiant energy absorptive coating.

26. The process of claim 25 wherein said teeth are coated superficial to said energy absorptive coating with a release coating.

* * * * *